US010369967B2

United States Patent
Sako et al.

(10) Patent No.: US 10,369,967 B2
(45) Date of Patent: Aug. 6, 2019

(54) VEHICLE AND PROGRAM FOR VEHICLE

(71) Applicant: MICO LATTA INC., Tokyo (JP)

(72) Inventors: Yoichiro Sako, Tokyo (JP); Masahiro Suzuki, Tokyo (JP)

(73) Assignee: MICO LATTA INC., Tokyo (JP)

( * ) Notice: Subject to any disclaimer, the term of this patent is extended or adjusted under 35 U.S.C. 154(b) by 173 days.

(21) Appl. No.: 15/120,584

(22) PCT Filed: Mar. 20, 2015

(86) PCT No.: PCT/JP2015/058480
§ 371 (c)(1),
(2) Date: Aug. 22, 2016

(87) PCT Pub. No.: WO2015/151862
PCT Pub. Date: Oct. 8, 2015

(65) Prior Publication Data
US 2017/0008490 A1 Jan. 12, 2017

(30) Foreign Application Priority Data

Apr. 1, 2014 (JP) .................................. 2014-075079

(51) Int. Cl.
*B60R 25/30* (2013.01)
*B60R 25/25* (2013.01)
(Continued)

(52) U.S. Cl.
CPC ............ *B60R 25/305* (2013.01); *B60R 25/25* (2013.01); *G05D 1/0088* (2013.01); *G07C 9/00571* (2013.01)

(58) Field of Classification Search
CPC .... B60R 25/25; B60R 25/305; G05D 1/0088; G07C 9/00571
See application file for complete search history.

(56) References Cited

U.S. PATENT DOCUMENTS

2006/0049962 A1 3/2006 Okada
2006/0082437 A1 4/2006 Yuhara
(Continued)

FOREIGN PATENT DOCUMENTS

JP 2000-194417 7/2000
JP 2005-196516 7/2005
(Continued)

OTHER PUBLICATIONS

International Search Report issued in International Patent Application No. PCT/JP2015/058480, dated May 19, 2015, along with English language translation thereof.

*Primary Examiner* — Charles J Han
(74) *Attorney, Agent, or Firm* — Greenblum & Bernstein, P.L.C.

(57) ABSTRACT

A vehicle that even a person whose information for authentication is not registered can use includes: a first storing means for storing information for authentication of a passenger; a first authenticating means for carrying out authentication for a user who tries to use own vehicle using the information for authentication stored in the first storing means; a communicating means for carrying out communication with a destination; a second storing means for storing information for communication with a registered destination through the communicating means; a second authenticating means for carrying out authentication for the user by connecting to the registered destination using the information stored in the second storing means by means of the communicating means; and a determining means for determining whether the user is allowed to use the own vehicle in accordance with an authentication result of the first authenticating means and/or the second authenticating means.

18 Claims, 13 Drawing Sheets

(51) Int. Cl.
*G05D 1/00* (2006.01)
*G07C 9/00* (2006.01)

(56) References Cited

U.S. PATENT DOCUMENTS

| | | |
|---|---|---|
| 2013/0073114 A1 | 3/2013 | Nemat-Nasser et al. |
| 2015/0185034 A1* | 7/2015 | Abhyanker ............ G01C 21/36 701/23 |

FOREIGN PATENT DOCUMENTS

| | | | |
|---|---|---|---|
| JP | 2006-063627 | | 3/2006 |
| JP | 2006-077431 | | 3/2006 |
| JP | 2006063627 A | * | 3/2006 |
| JP | 2006-327346 | | 12/2006 |
| JP | 2007-113388 | | 5/2007 |
| JP | 2007-186144 | | 7/2007 |
| JP | 2007186144 A | * | 7/2007 |
| JP | 2008-090421 | | 4/2008 |
| JP | 2008-162498 | | 7/2008 |
| JP | 2009-104401 | | 5/2009 |
| JP | 2010-208554 | | 9/2010 |
| JP | 2011-025903 | | 2/2011 |

\* cited by examiner

VEHICLE AND PROGRAM FOR VEHICLE

TECHNICAL FIELD OF THE INVENTION

This invention relates to a vehicle and a program for a vehicle.

BACKGROUND ART OF THE INVENTION

Heretofore, for the sake of theft prevention for a vehicle, an apparatus and a method have been proposed in which information for authentication, such as biological information of a driver, is registered and stored in advance, authentication is carried out by referring to the stored information for authentication and information for authentication of the driver who gets in so as to be compared with each other and determining whether they coincide with each other or not, and opening and closing of a door of the vehicle and start of the vehicle are controlled by an authentication result (see Patent Document 1 and Patent Document 2 below, for example).

PRIOR ART DOCUMENTS

Patent Documents

Patent Document 1: JP2010-208554-A
Patent Document 2: JP2011-025903-A

SUMMARY OF THE INVENTION

However, the conventional apparatus and method described above require a person who is planning to drive a vehicle to register information for authentication, such as his or her biological information, in advance. Therefore, even though an owner of the vehicle or the like permits usage of the vehicle by a user who has not registered information for authentication, authentication cannot be succeeded by only the user. For this reason, troublesome labor as follows is required. Namely, a driver or the like who registered his or her information for authentication goes to the vehicle together with the user whose usage has been permitted, and succeeds the authentication, whereby the vehicle is set to a usable state, then the vehicle is delivered to the user permitted for usage.

Further, an automatic driving vehicle capable of autonomous traveling, which can travel in an unmanned manner, has been developed recently. However, in a case of such an automatic driving vehicle, it is predicted that there may be lots of cases in which, in order to allow a second user to use an automatic driving vehicle after a first user uses the vehicle, the automatic driving vehicle moves to a location at which the second user starts to use the vehicle by means of autonomous traveling, and the second user starts to use the automatic driving vehicle. In this case, in a case where the second user is a user who does not register information for authentication, even a user whose usage is permitted by the owner of the automatic driving vehicle or the like becomes a state where the user cannot start to use the vehicle no longer.

Further, heretofore, there has been a problem in which in order to allow a user to use the vehicle on the basis of only authentication by information for authentication that has been registered in advance, even a user whose information is registered but who has already lost an authority to use the vehicle is allowed to use the vehicle as long as the registered information is still stored.

It is an object of this invention to provide a vehicle by which the problems described above can be solved.

Means for Solving the Problems

In order to solve the problems described above, according to the present invention, there is provided a vehicle including:
  first storing means configured to store information for personal authentication of a passenger;
  first authenticating means configured to carry out authentication for a user using the information for personal authentication stored in the first storing means, the user trying to use his or her own vehicle;
  communicating means configured to carry out communication with a destination of the communication;
  second storing means configured to store information for carrying out communication with a registered destination through the communicating means;
  second authenticating means configured to connect to the registered destination by means of the communicating means using the information stored in the second storing means, and to carry out authentication for the user; and
  determining means configured to determine whether the user is allowed to use his or her own vehicle or not in accordance with an authentication result of the first authenticating means and/or the second authenticating means.

The vehicle according to the present invention may further be configured so that:
  the determining means determines that usage of the own vehicle is allowed in a case where the first authenticating means succeeds the authentication for the user, and
  in a case where the first authenticating means fails the authentication for the user, the second authenticating means carries out the authentication, and the determining means determines whether the user is allowed to use the own vehicle or not in accordance with the authentication result of the second authenticating means.

In a case where the vehicle is configured in this manner, even the user who tries to use the vehicle is a user whose information for authentication is not stored in the first storing means used for the authentication by the first authenticating means is allowed to use the vehicle if the authentication is succeeded by a destination stored and registered in the second storing means and caused to carry out the authentication by the second authenticating means (hereinafter, referred to as an "authentication permitter"). In this case, the authentication permitter can receive a request for authentication through the communicating means, and it is possible to notify the vehicle of an authentication result for the user through the communicating means.

Therefore, according to this invention, even a user whose information for authentication is not stored in the first storing means used for the authentication by the first authenticating means is allowed to use the vehicle.

Further, the vehicle according to the present invention may moreover be configured so that: in a case where the first authenticating means succeeds the authentication for the user and the second authenticating means succeeds the authentication for the user, the determining means determines that the user is allowed to use the own vehicle. In a case where the vehicle is configured in this manner, the user is allowed to use the vehicle when the authentication by the first authenticating means is succeeded and the authentication by the second authenticating means is also succeeded. Therefore, since the authentication becomes strict compared with a case where only the authentication by the first authenticating means is carried out, it becomes possible to prevent unauthorized use.

Effect According to the Invention

According to the device of this invention, even a user whose information for authentication that is used in the authentication by the first authenticating means is not stored in the storing means is allowed to use the vehicle. Further, since the authentication becomes strict, it is possible to prevent unauthorized use.

BRIEF EXPLANATION OF THE DRAWINGS

FIG. 14 is a view showing a part of a flowchart for explaining an example of a processing operation when the customer who is a user in the automatic driving vehicle illustrated in FIG. 10 gets in.

FIG. 15 is a view showing a part of the flowchart for explaining the example of the processing operation when the customer who is the user in the automatic driving vehicle illustrated in FIG. 10 gets in.

EMBODIMENTS FOR CARRYING OUT THE INVENTION

[First Embodiment]

Figure 1:
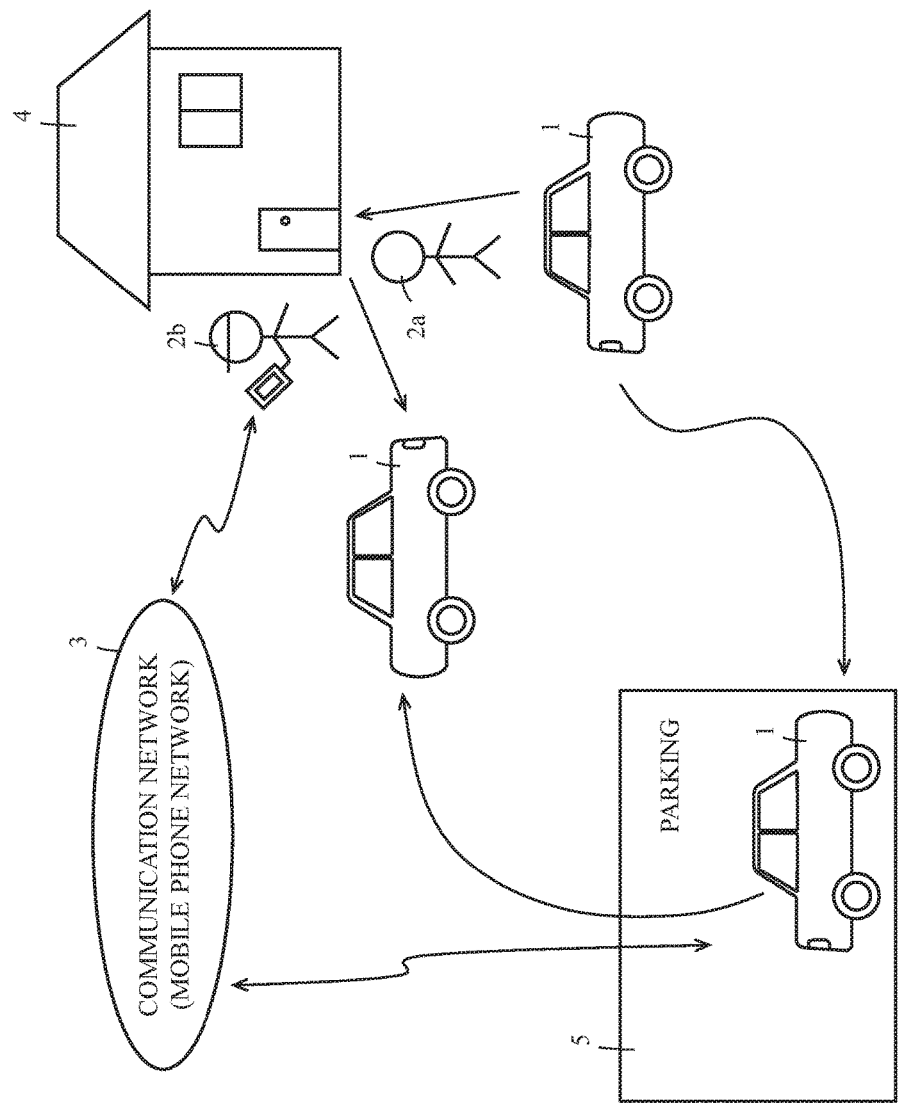
FIG. 1 is a view for explaining a communication system including a vehicle according to a first embodiment of this invention.

A first embodiment shows an example of a case where a vehicle is a so-called private vehicle and is configured as an automatic driving vehicle. In this first embodiment, an automatic driving vehicle 1 according to an embodiment of the vehicle of this invention is allowed to realize a form of use as shown in FIG. 1.

First, this form of use will be described, and an operation of the automatic driving vehicle 1 according to the embodiment will also be described. In the example shown in FIG. 1, a user 2A uses the automatic driving vehicle 1 (for example, drives or operates) to go back his or her home 4. The user 2A then gets out from the automatic driving vehicle 1, and enters his or her home 4. The user 2A instructs, when to get out therefrom, the automatic driving vehicle 1 move to a parking 5 that is slightly away from his or her home 4.

In this embodiment, the automatic driving vehicle 1 has a function to move by autonomous traveling in an unmanned operation manner. The automatic driving vehicle 1 moves to the parking 5 by the autonomous traveling of an unmanned operation in accordance with an instruction of the user 2A who got out from the vehicle.

Further, in this embodiment, the automatic driving vehicle 1 has a function to carry out communication through a communication network 3 including a mobile phone network and the Internet. When there is calling through the mobile phone network for this communication network 3, the automatic driving vehicle 1 carries out authentication for a caller 2B who calls to the automatic driving vehicle 1. In a case where the authentication is succeeded, the automatic driving vehicle 1 moves to a spot instructed by the caller 2B.

In this regard, in this embodiment, the user of a mobile phone terminal installs in advance an application program for calling the automatic driving vehicle 1 to the mobile phone terminal by which the calling to the automatic driving vehicle 1 is to be carried out. When the user carries out a calling operation to the automatic driving vehicle 1 using the application program for calling of the mobile phone terminal, the mobile phone terminal automatically carries out telephone calling to a wireless communication unit of the automatic driving vehicle 1. In this embodiment, at this time, a calling request to which information on a current location of the mobile phone terminal is added as location information of a spot at which the user calls to and waits for the automatic driving vehicle 1 is transmitted to the automatic driving vehicle 1. In a case where authentication for the caller is succeeded, the automatic driving vehicle 1 moves toward the spot indicated by this location information.

In this case, as the authentication for the caller, which is carried out by the automatic driving vehicle 1, first caller authentication and second caller authentication are carried out in this embodiment. In the first caller authentication, authentication for the caller is carried out using information for authentication stored in a storing unit. In the second caller authentication, an authentication permitter set up in advance is caused to carry out calling permission confirmation for the caller, and the automatic driving vehicle 1 receives its result to determine whether the authentication is succeeded or not.

As examples of the information for authentication of the caller stored in the storing unit for the first caller authentication, there are biological information such as a face image of the caller, a name, an address, the date of birth, an ID, a password, a telephone number and/or an email address, which can be used independently or in combination with plural subjects. The caller transmits this information for authentication to the automatic driving vehicle 1 through the mobile phone network using the mobile phone terminal. As the face image of the caller, one photographed by a camera with which the mobile phone terminal is provided can be used, and other biological information of the caller, which was stored in advance in a memory of the mobile phone terminal, can be used. Further, as other information, information inputted by the caller can be used. Further, the biological information containing the face image and the other information can be used by storing them on a cloud and obtaining them via the communication network 3.

In an example that will be described below, as an example of the information for authentication of the caller stored in the storing unit for the first caller authentication, there is a telephone number of his or her own mobile phone terminal registered and stored in the automatic driving vehicle 1 by a get-out person who gets out from the vehicle.

Further, as the authentication permitter or the second caller authentication, the owner of the automatic driving vehicle 1 or a person who finally got out from the automatic driving vehicle 1 can be set. For that reason, a telephone number of the owner of the automatic driving vehicle 1 or the person who finally got out from the automatic driving vehicle 1 (referred to as a "recently get-out person") is stored in the automatic driving vehicle 1.

In this embodiment, the authentication permitter for the second caller authentication is a person who finally got out from the automatic driving vehicle 1 and whose telephone number of the mobile phone terminal is registered. In the second caller authentication, the automatic driving vehicle 1 requests the caller to provide his or her information for authentication, and transmits the information for authentication, which is provided by the caller in response to the request, to the authentication permitter. The authentication permitter determines whether the calling of the automatic driving vehicle 1 by the caller is permitted or not on the basis of the information for authentication of the caller. In a case where it is determined to permit the calling, the authentication permitter transmits a calling permission confirmation result to the automatic driving vehicle 1.

Here, as examples of the information for authentication provided by the caller, as well as the information for authentication stored for the first caller authentication, there are biological information such as a face image of the caller, a name, an address, the date of birth, an ID, a password, a telephone number and/or an email address, which can be used independently or in combination with plural subjects. In an example that will be described below, the name and the face image of the caller are used.

The automatic driving vehicle 1 determines whether the second caller authentication is succeeded or not on the basis of whether the calling permission confirmation result is received from the authentication permitter or not. In a case where the second caller authentication is succeeded, the automatic driving vehicle 1 moves to a waiting location thus specified by means of autonomous traveling in response to the request of the caller.

The automatic driving vehicle 1 according to this embodiment carries out authentication for the user at the waiting location when the user who tries to newly start to use the automatic driving vehicle 1 gets in the automatic driving vehicle 1. The automatic driving vehicle 1 then allows only the user whose authentication is succeeded to use the automatic driving vehicle 1, that is, to cause the automatic driving vehicle 1 to travel. In this regard, the waiting location includes not only a case where the automatic driving vehicle 1 moves in response to the calling by the caller after moving temporarily like the example shown in FIG. 1, but also a case where the automatic driving vehicle 1 does not move after previously getting out from the automatic driving vehicle 1 and stops or is parked at the location.

In this case, in this embodiment, as the authentication for the user at the time of getting in the automatic driving vehicle 1, the automatic driving vehicle 1 carries out the first user authentication and second user authentication. In the first user authentication, authentication for the user is carried out using the information for authentication stored in the storing unit. In the second user authentication, the authentication permitter set up in advance is caused to carry out usage permission confirmation of the user, and the automatic driving vehicle 1 receives its result to carry out authentication.

As examples of the information for authentication of the user, which is to be stored in the storing unit for the first user authentication, biological information of the user, such as a face image, a fingerprint, a voice, a vein, an iris or the like of the user, is used. In an example that will be described below, a recent face image of a get-out person is photographed and stored in the storing unit for the first user authentication. Namely, in the example shown in FIG. 1, the automatic driving vehicle 1 photographs the face image of the user when the user gets out from the vehicle, and stores the photographed face image in the storing unit for the first user authentication as the information for authentication.

Further, the authentication permitter for the second user authentication is similar to the authentication permitter of the second caller authentication, and can be the owner of the automatic driving vehicle 1 or the person who finally got out from the automatic driving vehicle 1.

In this embodiment, the authentication permitter for the second user authentication is a person who finally got out from the automatic driving vehicle 1 and whose telephone number of the mobile phone terminal is registered. In the second user authentication, the automatic driving vehicle 1 requests the user to provide his or her information for authentication, and transmits the information for authentication, which is provided by the user in response to the request to the authentication permitter. The authentication permitter determines whether usage of the automatic driving vehicle 1 by the user is permitted or not on the basis of the information for authentication of the user. In a case where it is determined to be permitted, the authentication permitter transmits a usage permitting confirmation result to the automatic driving vehicle 1.

Here, as examples of the information for authentication provided by the user, as well as the information for authentication stored in the first caller authentication, there are biological information such as a face image of the user, a name, an address, the date of birth, an ID, a password, a telephone number and/or an email address, which can be used independently or in combination with plural subjects. In an example that will be described below, the name and the date of birth of the user are used.

The automatic driving vehicle 1 determines whether the second user authentication is succeeded or not on the basis of whether the usage permitting confirmation result is received from the authentication permitter or not. In a case where it is determined that the second user authentication is succeeded, usage of the own vehicle by the user is permitted. Namely, the user is allowed to cause the automatic driving vehicle 1 to travel.

For example, in the example of FIG. 1, when the user 2A who got out from the vehicle makes a phone calling to the automatic driving vehicle 1 by means of his or her own mobile phone terminal in his or her home 4, the telephone number coincides with the telephone number of the mobile phone terminal stored at the time of getting out from the automatic driving vehicle 1. For this reason, in this embodiment, the automatic driving vehicle 1 determines that the first caller authentication is succeeded in the first caller authentication, and goes toward his or her home 4 of the user 2A from the parking 5 in response to the calling.

Then, when the automatic driving vehicle 1 arrive at his or her home 4, the user 2A gets in the automatic driving vehicle 1. The automatic driving vehicle 1 obtains a face image of the user 2A who gets in the automatic driving vehicle 1 by photographing it. The automatic driving vehicle 1 then compares the face image of the user 2A stored at the time of getting out from the automatic driving vehicle 1 with the face image of the user 2A thus obtained by photographing it. In this case, since both of the face images coincide with each other, the automatic driving vehicle 1 determines that the authentication by the first user authentication is succeeded, and permits usage of the automatic driving vehicle 1 by the user 2A.

On the other hand, in the example shown in FIG. 1, when a user 2B other than the user 2A who got out from the user (for example, a family of the user 2A) makes a phone calling to the automatic driving vehicle 1 by means of his or her own mobile phone terminal in his or her home 4. In this embodiment, in the first caller authentication, the telephone number thus called does not coincide with the telephone number of the mobile phone terminal stored at the time of getting out from the automatic driving vehicle 1. At this time, the automatic driving vehicle 1 makes a phone call to the user 2A who got out from the automatic driving vehicle 1, who is the authentication permitter. In this embodiment, the automatic driving vehicle 1 then obtains the information for authentication, which is composed of the name and the face image of the caller 2B, from the user 2B who is a caller as the information for authentication, and transmits it to the user 2A who is the authentication permitter. The user 2A who is the authentication permitter minutely investigates the information for authentication thus transmitted, and determines whether calling of the automatic driving vehicle 1 is permitted or not. In a case where it is determined to permit the calling, the user 2A transmits calling permission confirming notification to the automatic driving vehicle 1. In a case where it is determined not to permit the calling, the user 2A transmits calling non-permission notification to the automatic driving vehicle 1.

Here, in a case where the calling permission confirming notification is transmitted from the mobile phone terminal of the user 2A who is the authentication permitter, the automatic driving vehicle 1 determines that the second caller authentication is succeeded on the basis of the calling permission confirming notification from the authentication permitter, and goes, in response to the calling of the caller, toward a waiting location specified by the user 2B, that is, his or her home 4 of the user 2A in the example shown in FIG. 1. This is because the user 2B is the family of the user 2A.

When the automatic driving vehicle 1 arrives at his or her home 4, the user 2B gets in the automatic driving vehicle 1. The automatic driving vehicle 1 then compares the face image of the user 2A stored at the time of getting out from the automatic driving vehicle 1 with the photographed face image of the user 2B who gets in the automatic driving vehicle 1. Since the face images do not coincide with each other, the automatic driving vehicle 1 determines that the authentication by the first user authentication is failed. At this time, the automatic driving vehicle 1 then makes a phone call to the user 2A who got out from the automatic driving vehicle 1, who is the authentication permitter. The automatic driving vehicle 1 obtains predetermined information for authentication from the user 2B (in this embodiment, information for authentication composed of the name and the face image of the user 2B), and transmits it to the user 2A who is the authentication permitter. The user 2A who is the authentication permitter minutely investigates the information for authentication thus transmitted, and determines whether usage of the automatic driving vehicle 1 is permitted or not. In a case where it is determined to permit the usage, the user 2A transmits usage permission confirming notification to the automatic driving vehicle 1. In a case where it is determined not to permit the usage, the user 2A transmits usage non-permission notification to the automatic driving vehicle 1. In this embodiment, the usage permission confirming notification is transmitted to the automatic driving vehicle 1.

The automatic driving vehicle 1 determines that the second user authentication is succeeded in accordance with the calling permission confirming notification from the authentication permitter, and permits usage of the automatic driving vehicle 1 by the user 2B.

[Example of Hardware Configuration of Automatic Driving Vehicle 1]

An example of a hardware configuration of the automatic driving vehicle 1 that realizes the processing described above will be described below.

Figure 2:
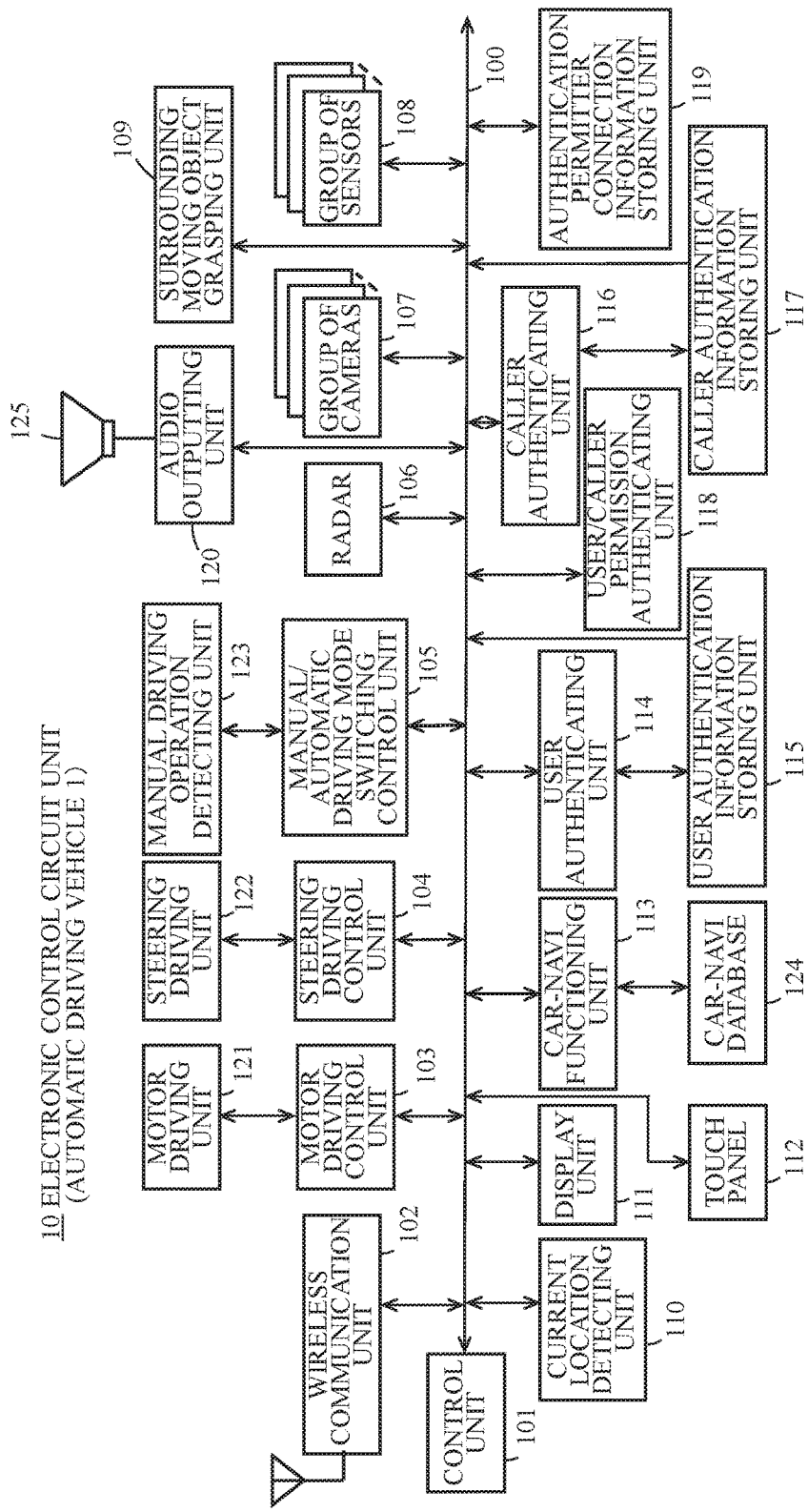
FIG. 2 is a block diagram showing an example of a hardware configuration of one example of an automatic driving vehicle, which is the vehicle according to the first embodiment of this invention.

FIG. 2 is a block diagram showing an example of a hardware configuration of an electronic control circuit unit 10 in the automatic driving vehicle 1 according to the first embodiment. It should be noted that the automatic driving vehicle 1 according to this embodiment is an example of a case where the vehicle is an electric vehicle. However, illustration of a battery is omitted in FIG. 2.

Further, the automatic driving vehicle 1 according to this embodiment includes an automatic driving mode and a manual driving mode. The manual driving mode is a mode in which the automatic driving vehicle 1 is allowed to travel in accordance with an accelerator pedal operation, a brake pedal operation, a shift lever operation and a steering operation (or a handle operation) of the driver as well as a normal vehicle that is not an automatic driving vehicle. Further, the automatic driving mode is a traveling mode in which even though the driver does not carry out any of the accelerator pedal operation, the brake pedal operation, the shift lever operation and the steering operation, the automatic driving vehicle 1 itself changes routes automatically (or autonomously) while avoiding an obstacle.

The driver of the automatic driving vehicle 1 switches the automatic driving vehicle 1 while traveling in the manual driving mode into the automatic driving mode by means of a predetermined operation via a touch panel 112 (will be described later), for example. The automatic driving vehicle 1 is configured so as to automatically return to the manual driving mode when the driver carries out the accelerator pedal operation, the brake pedal operation, the shift lever operation or the steering operation while traveling in the automatic driving mode.

As shown in FIG. 2, in the electronic control circuit unit 10, a wireless communication unit 102, a motor driving control unit 103, a steering driving control unit 104, a manual/automatic driving mode switching control unit 105, a radar 106, a group of cameras 107, a group of sensors 108, a surrounding moving object grasping unit 109, a current location detecting unit 110, a display unit 111, the touch panel 112, a car navigation (hereinafter, abbreviated to "car-navi") functioning unit 113, a user authenticating unit 114, a user authentication information storing unit 115, a caller authenticating unit 116, a caller authentication information storing unit 117, a user-and-caller permission authenticating unit 118, an authentication permitter connection information storing unit 119, and an audio outputting unit 120 are connect, through a system bus 100, to a control unit 101 configured so that a computer is mounted thereon.

A motor driving unit 121 is connected to the motor driving control unit 103. A steering driving unit 122 is connected to the steering driving control unit 104. A manual driving operation detecting unit 123 is connected to the manual/automatic driving mode switching control unit 105. Further, a car-navi database 124 is connected to the car-navi functioning unit 113. Moreover, a speaker 125 is connected to the audio outputting unit 120.

In this embodiment, the wireless communication unit 102 is provided with a function to carry out communication such as telephone communication and electronic mail communication via the mobile phone network. The control unit 101 includes, as software processing function, a function to carry out a process when a calling request is received from the caller through this wireless communication unit 102 and a processing function to carrying out the second caller authentication and the second user authentication by generating a communication channel with the person who is permitted for authentication.

The motor driving control unit 103 is configured to control a supply of a driving signal to the motor driving unit 121 of the automatic driving vehicle 1, which is the electric vehicle according to this embodiment, under a control of the control unit 101, and control traveling start, traveling speed control (including a brake control and an accelerator control), traveling stop and the like of the automatic driving vehicle 1.

The steering driving control unit 104 is configured to control, under a control of the control unit 101, a supply of a driving control signal to the steering driving unit 122 of the automatic driving vehicle 1 according to this embodiment, and control change in routes of the automatic driving vehicle 1.

The manual/automatic driving mode switching control unit 105 is configured to switching control the driving mode of the automatic driving vehicle 1 to any of the manual driving mode and the automatic driving mode in response to a selection operation input through the touch panel 112. The manual driving operation detecting unit 123 receives operation information such as the accelerator pedal operation, the brake pedal operation, the shift lever operation, and the steering operation by the driver, and supplies the operation information for the manual driving to the manual/automatic driving mode switching control unit 105.

The manual/automatic driving mode switching control unit 105 is configured to supply, when the automatic driving vehicle 1 is in the manual driving mode, the operation information for the manual driving from the manual driving operation detecting unit 123 to the motor driving control unit 103 and the steering driving control unit 104, and control the motor driving unit 121 and the steering driving unit 122 in accordance with the pedal operation, the shift lever operation, or the steering operation (handle operation) of the driver.

Further, the manual/automatic driving mode switching control unit 105 supplies, when the automatic driving vehicle 1 is in the automatic driving mode, operation information for the automatic driving generated in the control unit 101 to the motor driving control unit 103 and the steering driving control unit 104 on the basis of an output of the radar 106, the group of cameras 107, the group of sensors 108, or the surrounding moving object grasping unit 109 as will be described later, and controls driving of the motor driving unit 121 and the steering driving unit 122 by means of the operation information for the automatic driving. In this regard, in the automatic driving mode, a route from a current location toward a destination (destination) set up by the driver in the car-navi functioning unit 113 is searched, and the automatic driving vehicle 1 is controlled to travel along the searched route.

The radar 106 is one that measures a distance between the automatic driving vehicle 1 and a person or an object that exists around the automatic driving vehicle 1, and is composed of a laser radar, a millimeter wave radar, or the like. The laser radar is embedded in a roof or in the vicinity of bumper, for example. The millimeter wave radar is provided in the front of the vehicle and in the rear of the vehicle, for example. Both the laser radar and the millimeter wave radar may be provided, or only one of them may be provided. Further, other radar such as a micrometer wave radar may be used. Moreover, for the similar sake of the radar, a sonar (not shown in the drawings) may be used.

The group of cameras 107 includes: one camera to a plurality of cameras configured to photograph the interior of the automatic driving vehicle 1; and one camera to a plurality of cameras configured to photograph the surroundings of the exterior of the automatic driving vehicle 1, such as the front, the side and the rear of the automatic driving vehicle 1. The cameras configured to photograph the interior of the vehicle includes a camera configured to photograph a behavior of a person who gets in the automatic driving vehicle 1 and sits on the front passenger seat or a rear passenger seat (hereinafter, referred to as a "passenger"), in addition to a camera, attached to a back mirror (or rearview mirror, a room mirror), which is installed between a driver seat and a front passenger seat, or an upper portion of a front window, for example, configured to photograph a behavior of a person who sits on the driver seat (hereinafter, referred to as a "driver"). Further, the cameras configured to photograph the surroundings of the automatic driving vehicle 1 includes: two cameras (stereo camera), attached to a right side and a left side of the rearview mirror, configured to mainly photograph right front and left front of the automatic driving vehicle 1, for example; a camera, attached to a door mirror or a fender mirror of the automatic driving vehicle 1, for example, configured to photograph the right side and the left side; a camera configured to photograph the rear side of the automatic driving vehicle 1; and the like.

The group of sensors 108 is composed of a motion sensor (or infrared sensor) configured to detect a person in the vicinity of the outside of the automatic driving vehicle 1 and various kinds of sensors for obtaining information that supports the automatic driving in addition to an open/close detecting sensor configured to detect open or close of the door and open or close of the window, a sensor configured to detect wearing of a seat belt, and a seating sensor configured to detect whether a passenger sits on a seat such as the driver seat or the front passenger seat. As the various kinds of sensors for obtaining information that supports the automatic driving, a vibration sensor configured to detect vibration of the vehicle or a tire, for example, a rotational speed sensor configured to detect rotational speed of the tire, a geomagnetic sensor configured to detect an azimuth, an acceleration sensor configured to detect acceleration, a gyro sensor (or a gyroscope) configured to detect an angle or an angular velocity, and the like are contained. Further, in this embodiment, a sensor configured to detect lighting of a right winker, a left winker (direction indicator) or a hazard lamp (emergency flashing lamp) is contained in the group of sensors 108.

The surrounding moving object grasping unit 109 is configured to grasp a moving object (including a person) around the own vehicle using the radar 106, the group of sensors 108, and a photographed image of the group of cameras 107. The surrounding moving object grasping unit 109 carries out a process based on a Bayesian theory, for example, whereby an obstacle or a moving object around the vehicle is grasped.

The current location detecting unit 110 receives radio waves from GPS satellites, and detects a current location of the own vehicle. Since accuracy of the location detected on the basis of radio waves from the GPS satellites is low, the current location detecting unit 110 uses not only information on the current location detected by receiving the radio waves from the GPS satellites but also one sensor to plural sensors included in the group of sensors 108, the radar 106, the photographed image of the group of cameras 107 (together with a navigation function). The current location detecting unit 110 also carries out the process based on the Bayesian theory, for example, whereby the current location is detected and confirmed with higher accuracy.

In the automatic driving mode, the automatic driving vehicle 1 processes various kinds of information such as the location information obtained by receiving the radio waves from the GPS satellites, the radar 106, the group of cameras 107, and the group of sensors 108 in the current location detecting unit 110 and the surrounding moving object grasping unit 109, that is, information corresponding to information obtained from eyes and ears of a human by means of the Bayesian theory. On the basis of this, the control unit 101 carries out intellectual information processing (artificial intelligence) and control (artificial intelligence), such as change in routes of the own vehicle and avoidance of an obstacle, and generates the operation information for the automatic driving.

The display unit 111 is composed of an LCD (Liquid Crystal Display), for example. The touch panel 112 is configured so that a touch sensor capable of a touch input by a finger is superimposedly provided on a display screen of the display unit 111 that is composed of the LCD. A display image including a software button (including a button for character input of a keyboard) is displayed on the display screen of the display unit 111 on the basis of the control of the control unit 101. Then, when the touch panel detects a touch by a finger on the software button displayed on the display screen, the touch panel 112 communicates the touch to the control unit 101. The control unit 101 that receives this is configured to carry out a control process corresponding to the software button.

Map data and route guidance data in the country are stored in advance in the car-navi database 124 connected to the car-navi functioning unit 113. The car-navi functioning unit 113 is a function unit for guiding the automatic driving vehicle 1 so as to help the automatic driving vehicle 1 to move to the specified destination on the basis of the map stored in the car-navi database 124 and the route guidance data. In this embodiment, the car-navi functioning unit 113 is configured so as to carry out the processes slightly different between the manual driving mode and the automatic driving mode.

Namely, in the manual driving mode, the car-navi functioning unit 113 displays an image, in which a location of the own vehicle detected and confirmed by the current location detecting unit 110 is superimposedly displayed on a map in which a route to the destination is explicitly displayed, on the display screen of the display unit 111. The car-navi functioning unit 113 moves the location of the own vehicle (current location) on the map along with movement of the own vehicle, and carries out voice guidance at a point at which the route guidance is required, such as an intersection and a junction on the route. This is similar to a normal car-navi function.

On the other hand, in the automatic driving mode, when the current location of the own vehicle is apart from the route to the destination, the car-navi functioning unit 113 notifies the control unit 101 of information on a separating direction and a distance. When the current location of the own vehicle exists on the route to the destination, the car-navi functioning unit 113 notifies the control unit 101 of change instruction information of a course direction along the route before an intersection or a junction on the route along with the movement of the own vehicle. The control unit 101 controls the motor driving unit 121 through the motor driving control unit 103 on the basis of the information notified by the car-navi functioning unit 113, the confirmation result of the current location of the current location detecting unit 110 and the result grasped by the surrounding moving object grasping unit 109 so that the own vehicle moves through a course as instructed on the route. The control unit 101 also generates the operation information for the automatic driving for controlling the steering driving unit 122 through the steering driving control unit 104. Therefore, on the basis of the route guidance to the destination by the car-navi functioning unit 113 and the control unit 101 in the automatic driving mode, the automatic driving vehicle 1 can move to the destination even in non-passenger state.

The user authenticating unit 114 carries out the first user authentication described above using the information for authentication of the user, stored in the user authentication information storing unit 115, and information for authentication obtained from a new user. In this embodiment, as described above, the first user authentication is carried out on the basis of whether the face image of the recently get-out person coincides with the face image of the new user or not. Thus, this user authenticating unit 114 is configured as image recognizing means.

In this embodiment, a face image of the get-out person photographed by a predetermined camera of the group of cameras 107 is stored in the user authentication information storing unit 115. In this embodiment, the face image of the recently get-out person photographed by the camera is updated and stored in the user authentication information storing unit 115 so as to overwrite it on the face image of the get-out person previously stored. In this regard, a history of the face image of the get-out person may be left so that the face image is not overwritten but stored in turn.

In this regard, in a case where the first user authentication is carried out on the basis of the voice of the user, the automatic driving vehicle 1 is configured as follows. Namely, a microphone (not shown in the drawings) for collecting a voice of the get-out person is provided in the automatic driving vehicle 1. The voice of the get-out person is stored in the user authentication information storing unit 115. The user authenticating unit 114 is provided with a speaker voice recognition function. The first user authentication is carried out by determining whether the stored voice coincides with the voice of the new user collected by the microphone (not shown in the drawings) or not.

Further, in a case where the first user authentication is carried out by a fingerprint of the user, the automatic driving vehicle 1 is configured so that: a fingerprint reading apparatus is provided in the automatic driving vehicle 1; a fingerprint of the get-out person is stored in the user authentication information storing unit 115; the user authenticating unit 114 has a fingerprint recognition function. The user authenticating unit 114 determines whether the stored fingerprint coincides with a fingerprint of a new user obtained by the fingerprint reading apparatus, whereby the first user authentication is carried out. In a case of using a vein, an iris, or other biological information, it can be realized by changing a similar configuration.

The caller authenticating unit 116 carries out the first caller authentication described above using the information for authentication of the caller stored in the caller authentication information storing unit 117 and the information for authentication obtained from the caller when to receive calling by the wireless communication unit 102. In this embodiment, as described above, the first caller authentication is carried out on the basis of whether the telephone number of the mobile phone terminal of the recently get-out person coincides with the telephone number of the mobile phone terminal of the caller or not. Thus, the first caller authentication is configured so that: this caller authenticating unit 116 obtains, when there is incoming from the caller to the wireless communication unit 102, the telephone number; and determines whether the telephone number coincides with the telephone number stored in the caller authentication information storing unit 117 or not.

In this embodiment, the telephone number of the mobile phone terminal of the recently get-out person, inputted through the touch panel 112, is stored in the caller authentication information storing unit 117. By overwriting the telephone number stored in the caller authentication information storing unit 117 on the telephone number previously stored, the telephone number of only the recently get-out person is stored. In this regard, a history of the telephone number of the get-out person may also be left so that the telephone number is not overwritten but stored in turn.

In this regard, the configurations of the caller authenticating unit 116 and the caller authentication information storing unit 117 are changed in accordance with a difference of the information to be used as the information for authentication as well as the user authenticating unit 114 and the user authentication information storing unit 115.

The user-and-caller permission authenticating unit 118 carries out the function for the second user authentication described above and a second caller authentication function. Namely, the user-and-caller permission authenticating unit 118 has a function to obtain information for authentication from a user or caller and a function to: gene an authentication permitter and a communication channel; transmit the information for authentication obtained from the user or caller to the authentication permitter through the generated communication channel; and obtain information on permission and non-permission from the authentication permitter.

In this embodiment, as described above, the telephone number of the mobile phone terminal of the get-out person is stored in the authentication permitter connection information storing unit 119 as the authentication permitter connection information.

Thus, the automatic driving vehicle 1 according to this embodiment is configured so that setting the authentication mode described above to ON or OFF using the user authenticating unit 114, the user authentication information storing unit 115, the caller authenticating unit 116, the caller authentication information storing unit 117, the user-and-caller permission authenticating unit 118 and the authentication permitter connection information storing unit 119 can be carried out through the touch panel 112. However, the ON/OFF setting of the authentication mode becomes possible only when authentication is succeeded by an ID and a password set up in advance by the owner or the like of the automatic driving vehicle 1, for example. Further, the ON/OFF setting becomes possible for each of the first caller authentication, the second caller authentication, the first user authentication, and the second user authentication. However, in an embodiment which will be described below, ON/OFF of the authentication mode corresponds to the ON/OFF setting for all of the first caller authentication, the second caller authentication, the first user authentication, and the second user authentication.

Although its illustration is omitted, the audio outputting unit 120 includes therein a memory for storing voice message data by which sound is emitted to the outside, and a voice synthesizer and a D/A converter for converting the voice message data read out from the memory into an analog voice signal. The audio outputting unit 120 supplies a voice message selected by a control of the control unit 101 to the speaker 125, and emits sound to the outside as the voice. In this regard, as the voice message to be stored, an inquiry message such as "the authentication mode is to be turned ON?" and a notification message such as "authentication is succeeded" and "authentication is failed" are prepared as will be described later, for example.

As described above, the electronic control circuit unit 10 of the automatic driving vehicle 1 is configured. However, the respective processing functions, including the motor driving control unit 103, the steering driving control unit 104, the manual/automatic driving mode switching control unit 105, the surrounding moving object grasping unit 109, the current location detecting unit 110, the car-navi functioning unit 113, the user authenticating unit 114, the caller authenticating unit 116, the user-and-caller permission authenticating unit 118, and the audio outputting unit 120, of the respective processing blocks shown in FIG. 2 can be realized as software processing, which is carried out in accordance with execution of programs by the control unit 101.

[Example of Processing Operation in Automatic Driving Vehicle 1 according to First Embodiment]

Next, a processing operation related to the authentication mode described above in the automatic driving vehicle 1 according to the first embodiment will be described below. In the following explanation, a case where the control unit 101 realizes the respective processing functions of the motor driving control unit 103, the steering driving control unit 104, the manual/automatic driving mode switching control unit 105, the surrounding moving object grasping unit 109, the current location detecting unit 110, the car-navi functioning unit 113, the user authenticating unit 114, the caller authenticating unit 116, the user-and-caller permission authenticating unit 118, and the audio outputting unit 120 of the respective blocks shown in FIG. 2 as software processing will be described.

<Getting Out Processing>

Figure 3:
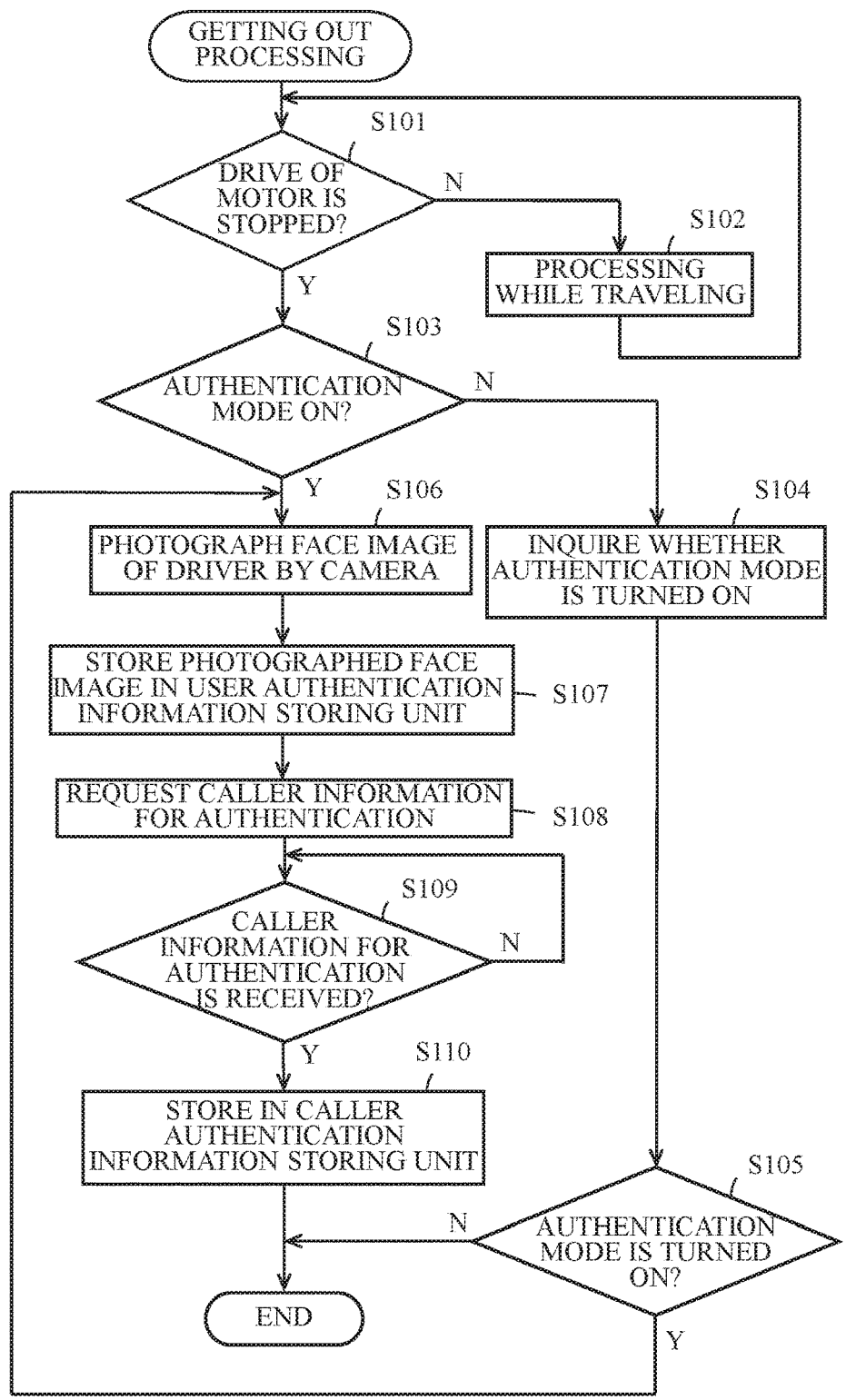
FIG. 3 is a view showing a flowchart for explaining an example of processing when a user gets out from the automatic driving vehicle illustrated in FIG. 2.

FIG. 3 is a view showing a flowchart for explaining an example of a processing flow carried out by the control unit 101 when a user gets out from the automatic driving vehicle 1.

The control unit 101 determines whether drive of the motor driving unit 121 in his or her own vehicle is stopped by a user (for example, a driver, hereinafter, will be explained as a case where the user is a driver) who turns a power supply system OFF or not (Step S101). In a case where it is determined at Step S101 that the drive of the motor driving unit 121 is not stopped, the control unit 101 continues a necessary control while traveling (Step S102), and then causes the processing flow to return to Step S101.

In a case where it is determined at Step S101 that the drive of the motor driving unit 121 is stopped, the control unit 101 determines whether the authentication mode is turned ON or not (Step S103) because it is normally expected that the driver will get out therefrom.

In a case where it is determined at Step S103 that the authentication mode is turned ON, the control unit 101 photographs a face image of the driver by a camera for photographing the driver in the group of cameras 107 (Step S106), and stores face image information of the driver thus photographed in the user authentication information storing unit 115 (Step S107).

Next, the control unit 101 emits sound of a message for encouraging the driver to input caller information for authentication through the speaker 125; causes the display unit 111 to display this message on the display screen; and requests caller information for authentication (Step S108). In this embodiment, for example, the control unit 101 emits sound of the message "please input a telephone number for calling" through the speaker 125, and causes the display unit 111 to display the message on the display screen.

Next, the control unit 101 waits for reception of caller information for authentication while determining whether caller information for authentication is received or not (Step S109). In a case where it is determined that the caller information for authentication is received, the control unit 101 stores the caller information for authentication in the caller authentication information storing unit 117 (Step S101). The control unit 101 then terminates this getting out processing routine.

Further, in a case where it is determined at Step S103 that the authentication mode is not turned ON, the control unit 101 emits sound of a message of inquiring whether the authentication mode is turned ON to the driver, through the speaker 125, and causes the display unit 111 to display an icon button for changing setting of the authentication mode into ON on the display screen (Step S104). Next to Step S104, the control unit 101 determines whether the driver turns the authentication mode ON or not (Step S105). In a case where it is determined that the authentication mode is not turned ON (for example, the driver gets out without turning the authentication mode ON), the control unit 101 terminates this getting out processing routine. Then, in a case where it is determined at Step S105 that the authentication mode is turned ON, the control unit 101 causes the processing flow to proceed to Step S106, and repeats these processes after Step S106.

<Calling Handling Processing>

Figure 4:
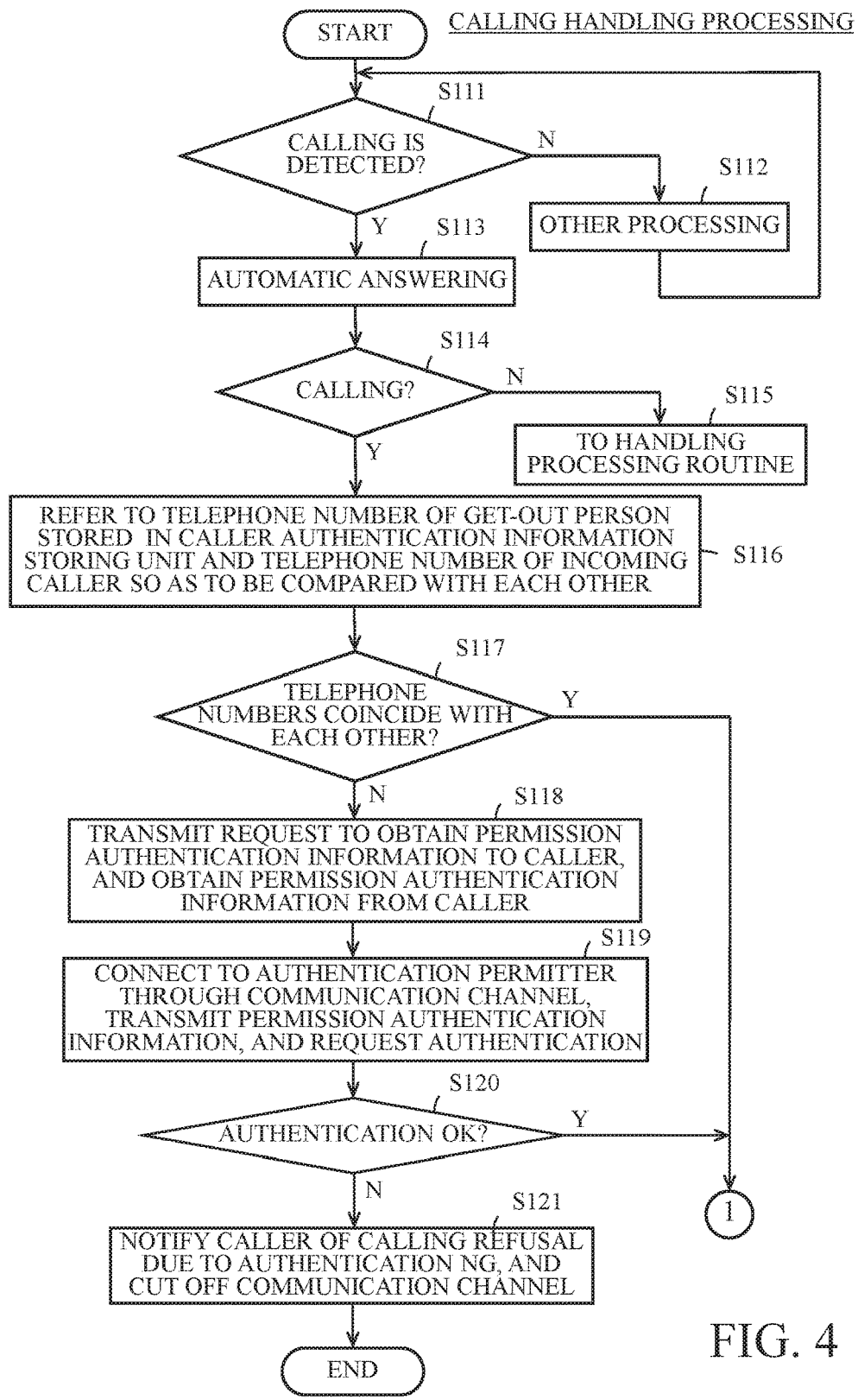
FIG. 4 is a view showing a part of a flowchart for explaining an example of a processing operation corresponding to calling of the user in the automatic driving vehicle illustrated in FIG. 2.
Figure 5:
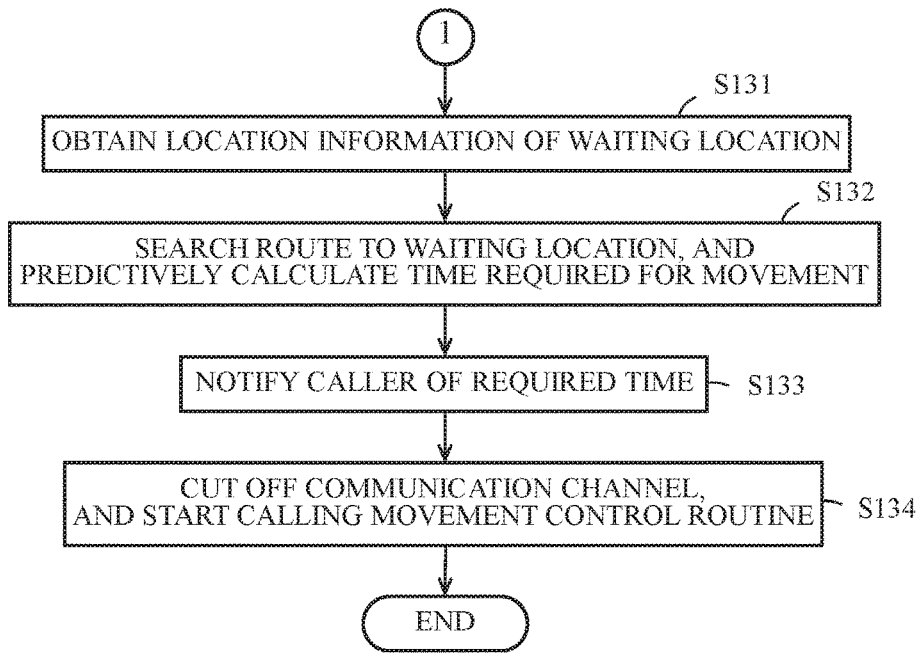
FIG. 5 is a view showing a part of the flowchart for explaining an example of a processing operation corresponding to calling of the user in the automatic driving vehicle illustrated in FIG. 2.

Next, FIG. 4 and FIG. 5, which follow FIG. 4, are views showing a flowchart for explaining an example of a flow of a processing operation of the control unit 101 in a case where there is an incoming of calling to the automatic driving vehicle 1. In this embodiment, as described above, a calling request for calling the automatic driving vehicle 1 is carried out by starting the application program from the mobile phone terminal into which the dedicated application program is installed in advance. In this case, information that it is a calling request and information on a current location measured by the mobile phone terminal as the waiting location are contained in a transmission signal from the mobile phone terminal to the automatic driving vehicle 1.

The control unit 101 monitors incoming notification from the wireless communication unit 102, and determines whether an incoming is detected or not (Step S111). In a case where it is determined that no incoming is detected, the control unit 101 carries out other necessary processing (Step S112), and then causes the processing flow to return to Step S111.

In a case where it is determined at Step S111 that an incoming is detected, the control unit 101 carries out an automatic answering (Step S113), and determines whether the incoming is a calling request or not (Step S114). In a case where it is determined that the incoming is not a calling request, the control unit 101 causes the processing flow to proceed to a handling processing routine for the incoming (Step S115).

In a case where it is determined at Step S114 that the incoming is a calling request, the control unit 101 carries out the first caller authentication. Namely, in this embodiment, the control unit 101 refers to the telephone number of the mobile phone terminal of the get-out person, stored in the caller authentication information storing unit 117, and a telephone number of a person who is incoming so as to be compared with each other (Step S116); determines whether they coincide with each other or not (Step S117); and carries out the first caller authentication.

Then, in a case where it can be confirmed at Step S117 that the telephone numbers coincide with each other and the first caller authentication is succeeded, the control unit 101 extracts and obtains location information on the waiting location, which is transmitted from the caller (Step S131 in FIG. 5). Next, the control unit 101 searches, by means of the function of the car-navi functioning unit 113, a route to the waiting location using data of the car-navi database 124, and predictively calculates the time required to move to the waiting location (Step S132). Next, the control unit 101 transmits, to the caller, the time required thus predictively calculated through the wireless communication unit 102 (Step S133). Next, the control unit 101 cuts off (or disconnects) the communication with the caller; starts a movement control routine until the waiting location; and terminates this processing routine (Step S134).

Further, in a case where it is determined at Step S117 that the telephone numbers do not coincide with each other and the first caller authentication is thereby impossible, the control unit 101 carries out the second caller authentication as follows. Namely, the control unit 101 transmits a request to obtain information for permission authentication to a destination (or a caller), and obtains the information for permission authentication from the destination (or the caller)

(Step S118). In this embodiment, the information for permission authentication contains a face image and a name of the destination (or the caller). The mobile phone terminal of the destination (or the caller) photographs the face image of the caller by means of the camera of the mobile phone terminal in accordance with the dedicated application program described above, and transmits the photographed face image and the name of the caller stored in advance to the automatic driving vehicle 1. Thus, the automatic driving vehicle 1 receives it.

Next to Step S118, the control unit 101 generates a communication channel with the authentication permitter using information for connection stored in the authentication permitter connection information storing unit 119 with another line for the mobile phone terminal in the wireless communication unit 102. The control unit 101 then transmits the information for permission authentication of the caller, which has been obtained at Step S118, to the authentication permitter through the generated communication channel, and requests authentication to the authentication permitter (Step S119).

In response to the authentication request to the authentication permitter at Step S119, as described above, any one of a calling permission confirmation result and a calling non-permission result is transmitted from the authentication permitter. The control unit 101 then determines whether the second caller authentication is succeeded or not on the basis of whether the calling permission confirmation result is received from the authentication permitter (Step S120). In a case where it is determined at Step S120 that the calling permission confirmation result is received from the authentication permitter and the second caller authentication is succeeded, the control unit 101 causes the processing flow to proceed to Step S131 of FIG. 5, and carries out the processes after Step S131 described above.

In a case where it is determined at Step S120 that the calling permission confirmation result is not received from the authentication permitter but the calling non-permission result is received and the second caller authentication is thus not succeeded, the control unit 101 generates a voice message to reject the calling by means of voice synthesis, for example, because the authentication is not succeeded. The control unit 101 transmits, for notification, the voice message to the caller through the wireless communication unit 102, and then cuts off the communication channel with the caller (Step S121). Herewith, the control unit 101 terminates this calling handling processing routine.

<Calling Movement Control>

Figure 6:
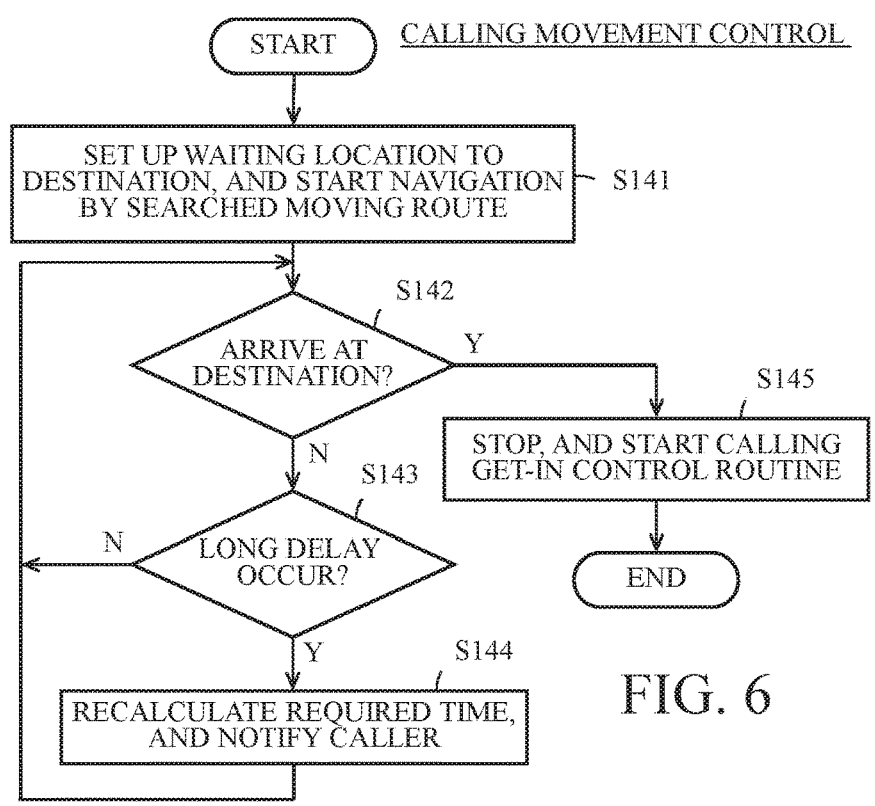
FIG. 6 is a view showing a flowchart for explaining an example of a control operation to move in accordance with the calling of the user in the automatic driving vehicle illustrated in FIG. 2.

Next, an example of the calling movement control routine that was started at Step S134 will be described with reference to FIG. 6.

The control unit 101 first sets the location, which was obtained at Step S131 and indicated by the location information on the waiting location, to a destination; carries out route search by the function of the car-navi functioning unit 113 using a current location as a starting point; and starts navigation (or guidance) along a moving route (route) of the search result, which is obtained as a result (Step S141).

The control unit 101 then confirms a current location during the movement to determine whether to arrive at the destination or not (Step S142). In a case where it is determined not to arrive at the destination, the control unit 101 further determines whether a long delay of ten minutes or longer occurs with respect to the time required to move to the waiting location, which was predicted, or not, for example (Step S143). In a case where it is determined that the long delay does not occur, the control unit 101 causes the processing flow to return to Step S142, and repeats the processes after Step S142. In a case where it is determined at Step S143 that the long delay occurs, the control unit 101 recalculates the time required, regenerates communication with the caller, and notifies the caller of the calculation result (Step S144). Then, the control unit 101 causes the processing flow to return to Step S142, and repeats the processes after Step S142.

In a case where it is determined at Step S142 that the vehicle arrives at the destination (waiting location), the control unit 101 causes the vehicle to stop at the waiting location, and starts a calling get-in control routine (Step S145). Then, the control unit 101 terminates this calling movement control routine.

<Calling Get-in Control>

Figure 7:
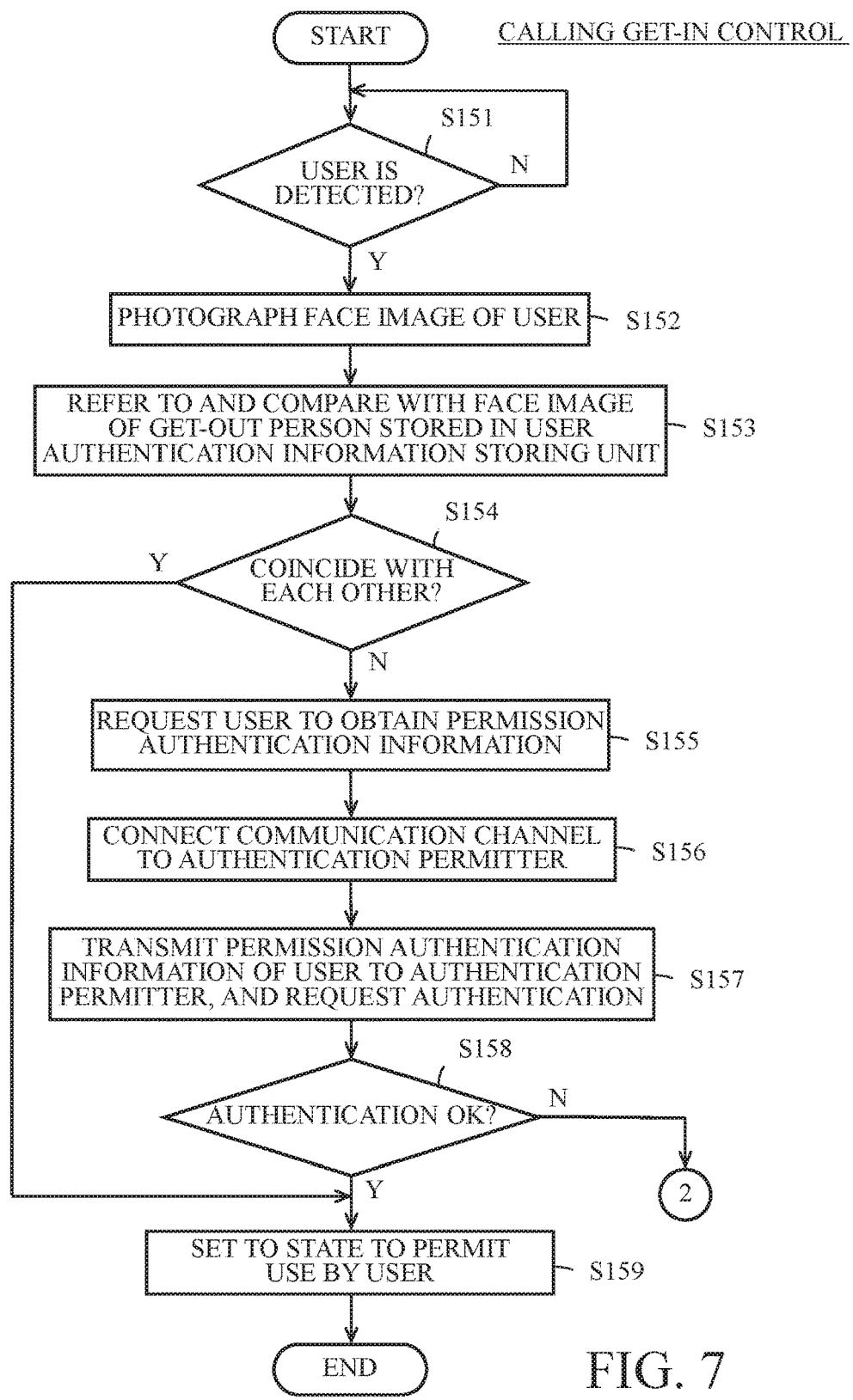
FIG. 7 is a view showing a part of a flowchart for explaining an example of a processing operation when the calling user gets in the automatic driving vehicle illustrated in FIG. 2.

Next, an example of the calling get-in control routine that is started at Step S145 will be described with reference to FIG. 7 and FIG. 8, which follows FIG. 7. In the following example, a case where the user is a driver who gets in the automatic driving vehicle 1 at the driver seat to travel will be described.

The control unit 101 monitors whether user's getting in the automatic driving vehicle 1 is detected or not, and waits for detection of user's getting in the automatic driving vehicle 1 (Step S151). When user's getting in the automatic driving vehicle 1 is detected at Step S151, the control unit 101 photographs a face image of the user (or the driver) who gets in the automatic driving vehicle 1 by means of a camera for photographing the driver of the group of cameras 107 (Step S152).

Next, the control unit 101 carries out first user authentication. Namely, in this example, the control unit 101 refers to the face image of the get-out person stored in the user authentication information storing unit 115 and the face image of the user who gets into the driver seat so as to be compared with each other (Step S153), and determines whether both of the face images coincide with each other or not (Step S154).

In a case where it is determined at Step S154 that the face images coincide with each other and the first user authentication is succeeded, the control unit 101 sets to a state to permit use (or driving) by the user on the driver seat (Step S159). The control unit 101 then terminates this calling get-in control routine.

In a case where it is determined at Step S154 that the face images do not coincide with each other and the first user authentication is not succeeded, the control unit 101 carries out the second user authentication as follows. Namely, the control unit 101 outputs a voice through the speaker 125, and causes the display unit 111 to display the message on the display screen. The control unit 101 then requests the user to obtain the information for permission authentication, and obtains the information for permission authentication of the user who received the request (Step S155). In this embodiment, the information for permission authentication is a face image and a name of the user. Since the face image of the user has already been obtained at Step S152, the control unit 101 requests the user to input his or her name, and receives the input of the name of the user in response to this request.

Next to Step S155, the control unit 101 generates a communication channel with the authentication permitter through the wireless communication unit 102 using the information for connection stored in the authentication permitter connection information storing unit 119 (Step S156). The control unit 101 then transmits the information for permission authentication of the user obtained at Step S155 to the authentication permitter through the generated communication channel, and requests the authentication permitter to carry out confirmation authentication (Step S157).

In response to the authentication request to the authentication permitter at Step S157, as described above, any one of the usage permitting confirmation result and a usage non-permission result is transmitted from the authentication permitter. Therefore, in this embodiment, the control unit 101 determines whether the second user authentication is succeeded or not on the basis of whether the usage permitting confirmation result is received from the authentication permitter or not (Step S158). In a case where it is determined at Step S158 that the usage permitting confirmation result is received from the authentication permitter and the second user authentication is thus succeeded, the control unit 101 causes the processing flow to proceed to Step S159, and sets to a state in which usage (or driving) by the user at the driver seat is permitted.

Figure 8:
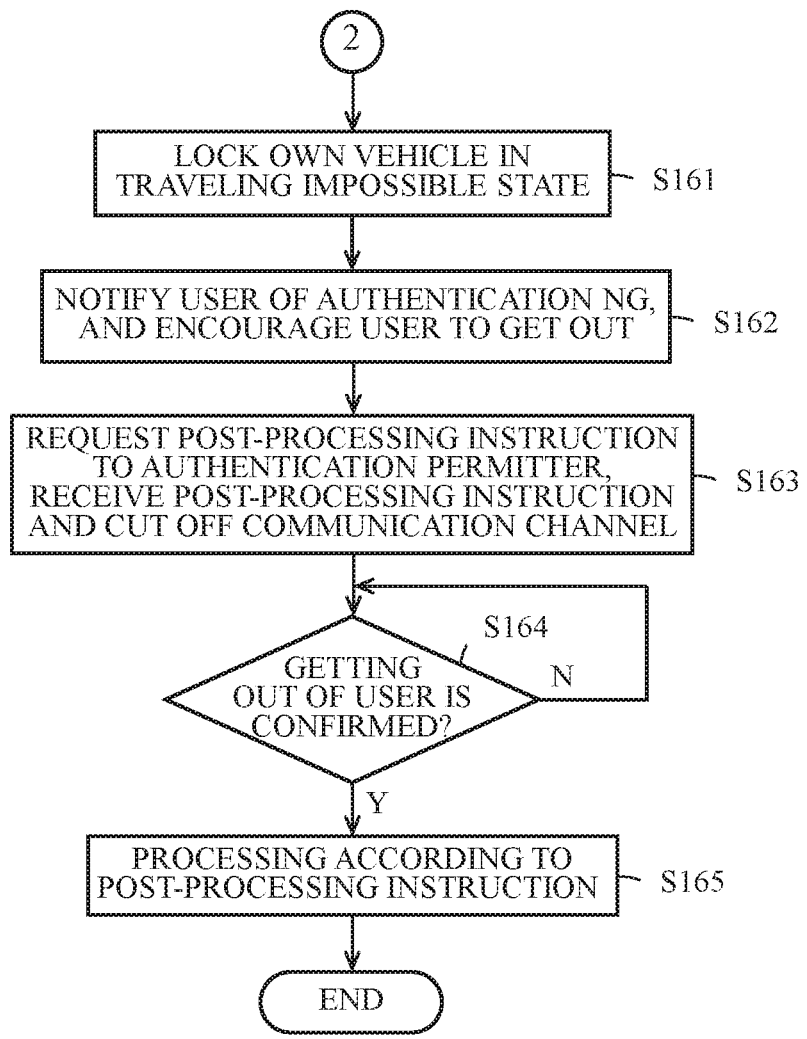
FIG. 8 is a view showing a part of a flowchart for explaining the example of the processing operation when the calling user gets in the automatic driving vehicle illustrated in FIG. 2.

In a case where it is determined at Step S158 that the usage permitting confirmation result is not received from the authentication permitter but the usage non-permission result is received and the second user authentication is not succeeded, the control unit 101 locks the own vehicle in a traveling impossible state, and sets to a non-permission state in which the user on the driver seat cannot use (or drive) (Step S161 in FIG. 8). This is because the authentication is not succeeded.

The control unit 101 then generates, for the user who gets in the automatic driving vehicle 1, a voice message indicating that the authentication is not succeeded and encouragement to get out therefrom by means of voice synthesis, for example, and notifies the user of them by emitting sound through the speaker 125 (Step S162).

Next, the control unit 101 requests the authentication permitter to obtain a post-processing instruction thereafter. When the post-processing instruction is received, the control unit 101 cuts off the communication channel with the authentication permitter (Step S163). As this post-processing instruction, there are instructions such as "return to parking" or "go back home", for example.

Next, the control unit 101 determines whether user's getting out from the automatic driving vehicle 1 who got in can be confirmed or not (Step S164). In a case where it is determined at Step S164 that user's getting out from the automatic driving vehicle 1 cannot be confirmed, the control unit 101 continues the process at the Step S164. In a case where it is determined at Step S164 that user's getting out from the automatic driving vehicle 1 can be confirmed, the control unit 101 carries out processes such as a movement control according to the post-processing instruction received at Step S163 (Step S165). That is all, the control unit 101 terminates this calling handling processing routine.

[Effects of First Embodiment]

In the automatic driving vehicle 1 according to the first embodiment described above, even when the first user authentication using the information for authentication of the user stored in the automatic driving vehicle 1 and the information for authentication of the new user is not succeeded, it is possible for the user to use the automatic driving vehicle 1 by carrying out the second user authentication based on the confirmation authentication of the user by the authentication permitter defined in advance. This makes it possible for the user different from the recently get-out person to use the automatic driving vehicle. In a case where the first user authentication is succeeded, the user can be permitted to use the automatic driving vehicle 1 without carrying out the second user authentication.

Further, according to the first embodiment described above, user is allowed to call to and use the automatic driving vehicle 1. In such a case, in the embodiment described above, the first caller authentication is also carried out, the second caller authentication is carried out. In a case where the first caller authentication is succeeded, the automatic driving vehicle 1 responds to the calling by the caller. In a case where the first caller authentication is not succeeded, the automatic driving vehicle 1 carries out the second caller authentication based on the confirmation authentication for the caller by the authentication permitter defined in advance, whereby the calling of the caller to the automatic driving vehicle 1 becomes possible. Therefore, even a caller who is not registered in advance in the automatic driving vehicle 1 is permitted for calling of the automatic driving vehicle 1, and this makes it very convenient.

[Variant of First Embodiment]

In this regard, in the embodiment described above, only the information for authentication of the user who got out from the automatic driving vehicle 1 is stored in the user authentication information storing unit 115. However, all users who are assumed to use the automatic driving vehicle 1 may be stored therein in advance. In such a case, in the first user authentication, not only the user who got out from the automatic driving vehicle 1 but also a user who is registered in advance uses the automatic driving vehicle 1 and the authentication is succeeded in the first user authentication, the user is allowed to use the automatic driving vehicle 1, whereby it is convenient.

Similarly, not only the information for authentication of the user who got out from the automatic driving vehicle 1, but also those of all users who are assumed to use the automatic driving vehicle 1 may be stored in the caller authentication information storing unit 117 in advance. in such a case, in the first caller authentication, when not only the user who got out from the automatic driving vehicle 1 but also all callers who are registered in advance carry out calling and the first caller authentication is succeeded, the calling becomes possible, whereby it is convenient.

In this regard, in the embodiment described above, in a case where the first user authentication is not succeeded, the control unit 101 carries out the second user authentication. However, the second user authentication may not be carried out (locked) on the basis of setting of the recently get-out person, whereby usage of the automatic driving vehicle 1 may become impossible. In a case where the recently get-out person necessarily uses the automatic driving vehicle 1 after getting out from the automatic driving vehicle 1, other user does not necessarily use the automatic driving vehicle 1. Thus, there is no need to inquire. A case of stopping at a store such as a supermarket or a convenience store for shopping or the like corresponds to this.

In the first embodiment described above, the telephone number stored in the caller authentication information storing unit 117 is the telephone number of the mobile phone terminal. However, it is not limited to the telephone number of the mobile phone terminal, and it goes without saying that it may be a telephone number of a landline telephone or a telephone number of an IP phone. Further, an email address may be used in place of the telephone number. The email address can be utilized not only by the mobile phone terminal, but also a PC or a tablet.

In the first embodiment above, the information on the current location is transmitted as the information on the waiting location in response to the calling request. However, any other spot than the current location may be specified as the waiting location. As the information on the waiting location in such a case, an address may be specified, or a spot "front of shop at North exit of YY station of XX line", or "front entrance of Ginza ZZ department store" may be specified. In such a case, the automatic driving vehicle 1 searches the waiting location in the map information of the car-navi database 124, and detects the waiting location. However, in a case where it cannot be detected, the automatic driving vehicle 1 accesses a map server or the like on the Internet through the wireless communication unit 102, and searches the waiting location. Thus, it is possible to detect the waiting location by obtaining the result. In such a case, search of a route to its meeting spot can also be carried out in cooperation with the map server, and navigation can be carried out by using a service of the map server.

Further, although the automatic driving vehicle 1 according to the first embodiment described above includes the automatic driving mode and the manual driving mode, it may be configured to include only the automatic driving mode. In this case, since the manual driving mode is not included, the manual/automatic driving mode switching control unit 105 and the manual driving operation detecting unit 123 are not required. Alternatively, an automatic driving control unit (not shown in the drawings) that carries out control processing for the automatic driving.

In this regard, with respect to the inventive portion regarding the first user authentication and the second user authentication, the vehicle is not limited to an automatic driving vehicle. The inventive portion can be applied to a conventional vehicle with no automatic driving mode in which an operation by a driver is essentially required. Further, since the automatic driving vehicle described above can be caused to travel without the driver, the user is not limited to the driver, but the user may be a passenger who sits on the front passenger seat or the rear passenger seat.

In the first embodiment described above, the user authentication information storing unit 115, the caller authentication information storing unit 117, the authentication permitter connection information storing unit 119, and the car-navi database 124 are installed within the own vehicle. However, a part or all of the storing units is not installed within the own vehicle, but may be installed on a cloud and can be used via the communication network 3. Moreover, a part or all of the authenticating units, such as the user authenticating unit 114, the caller authenticating unit 116, and the user-and-caller permission authenticating unit 118 can carry out the authentication thereof on the cloud via the communication network 3 without carrying out the authentication in the own vehicle.

[Second Embodiment]

Figure 9:
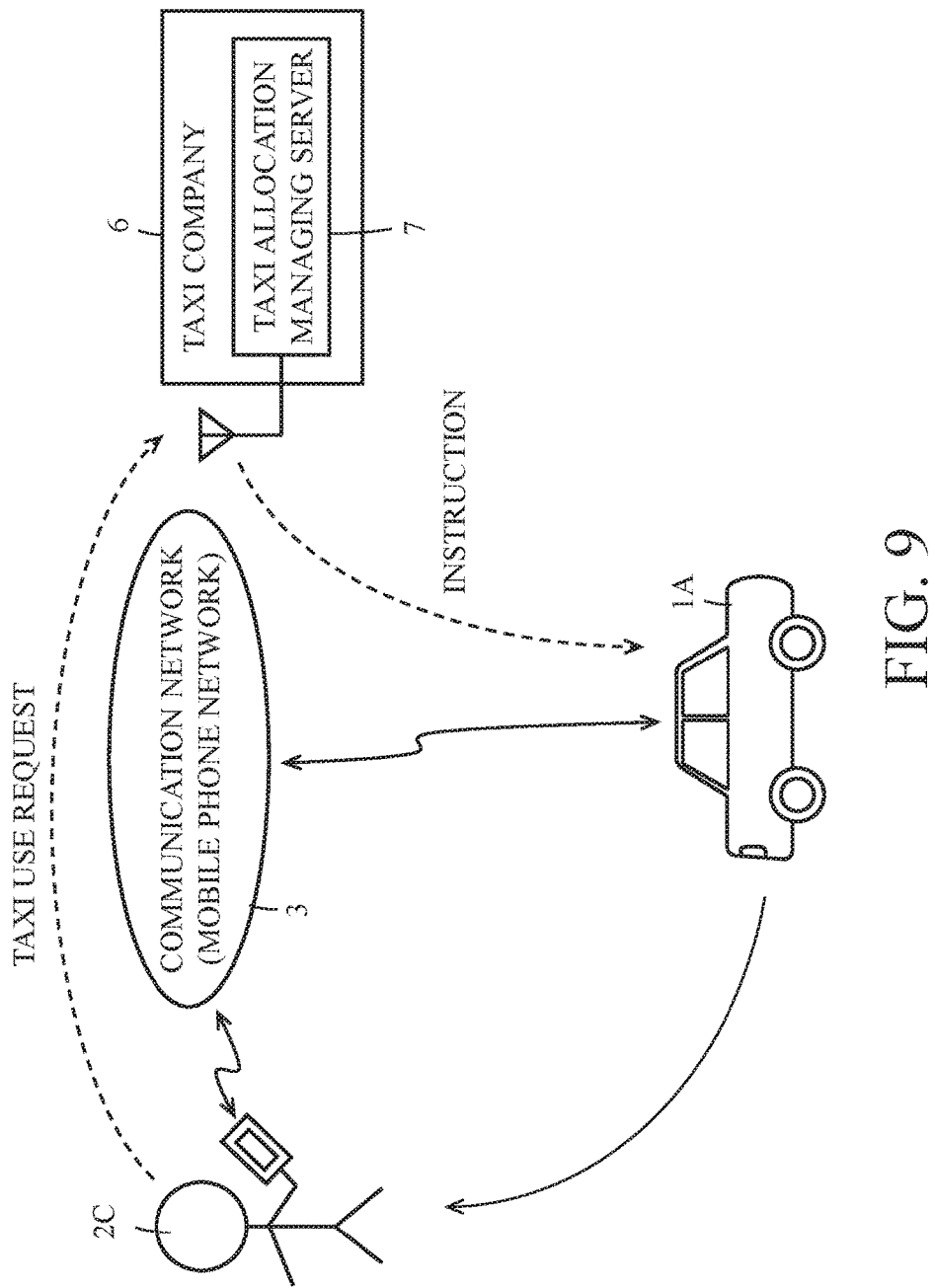
FIG. 9 is a view for explaining a communication system including a vehicle according to a second embodiment of this invention.

A second embodiment is an example of a case where a vehicle is a taxi managed by a taxi company and is configured by an automatic driving vehicle. In this second embodiment, with respect to an automatic driving vehicle 1A that is an embodiment of the vehicle according to this invention, a form of use as shown in FIG. 9 is enabled. In this regard, in the second embodiment, the same reference numerals are applied to the same units as those in the first embodiment, and their detailed explanation is omitted.

In this second embodiment, the automatic driving vehicle 1A constituting a taxi, a taxi user 2C, and a taxi allocation managing server 7 of the taxi company constitute a communication system in which they are connected to each other through the communication network 3 including the mobile phone network and the Internet.

The taxi user 2C accesses the taxi allocation managing server 7 of the taxi company 6 through the communication network 3 in advance, and registers him or her as a membership. The taxi user 2C then registers, when to register this membership, in advance biological information such as his or her own face image, voice, fingerprint, vein, and iris as information for user authentication as the user of the taxi. The information for user authentication is used for the first user authentication in which authentication is carried out for the user in the automatic driving vehicle 1A. In this embodiment, as the information for user authentication, a face image of the registered user is used.

Further, the taxi user 2C is caused to register his or her own name, address, date of birth, ID, password, telephone number and email address of the mobile phone terminal, credit card information, and settlement information such as bank account information of a financial institution. Moreover, as well as the first embodiment, an application program programmed to access the taxi allocation managing server 7 and transmit a request to allocate a taxi thereto together with his or her own current location is provided from the taxi company to the mobile phone terminal of the user 2C who becomes a member and installed.

In this embodiment, the user 2C starts the application program to carry out a request of allocation of the taxi by his or her own mobile phone terminal, and carries out an operation to request allocation of the taxi to the taxi allocation managing server 7.

The taxi allocation managing server 7 receives the request for allocation of the taxi. The taxi allocation managing server 7 then obtains the information on the current location of the user 2C, which is contained in the request for allocation of the taxi, and recognizes the location as the waiting location.

The taxi allocation managing server 7 then transmits, to the mobile phone terminal of the taxi user 2C, information indicating what the information for authentication for confirmation is. The information indicating what the information for authentication for confirmation is used for the second user authentication in the second embodiment.

Then, the taxi allocation managing server 7 selects and allocates a taxi that goes toward the waiting location of the user 2C among managed taxis. The taxi allocation managing server 7 transmits location information on the waiting location and information on the face image within registered information of the user 2C who is a member to the taxi to be allocated through the communication network 3 as the information for authentication for the first user authentication, causes the taxi to store them, and instructs the taxi to go to the waiting location of the user 2C.

The automatic driving vehicle 1A that receives this instruction goes to the specified waiting location, and carries out the first user authentication, as will be described later for the user, using the stored information for authentication, in this example, using the information of the face image of the user.

In a case where this first user authentication is succeeded, the automatic driving vehicle 1A carries out a request to obtain information for authentication for the second user authentication, which was defined at the time of the calling request, to the user who gets in the automatic driving vehicle 1A. The automatic driving vehicle 1A then transmits the obtained information for authentication to the taxi allocation managing server 7, and requests the confirmation authentication for the user.

Then, the taxi allocation managing server 7 obtains, from the registered information of the user who is a member carrying out the calling request, the information for authentication transmitted from the automatic driving vehicle 1A and the information for authentication for the second user authentication defined at the time of the calling request, and carries out the confirmation authentication for the user by comparing both of them with each other. In a case where the confirmation authentication is succeeded, the taxi allocation managing server 7 transmits the usage permitting confirmation result to the automatic driving vehicle 1A. In a case where the confirmation authentication is not succeeded, the taxi allocation managing server 7 transmits a usage impossible result to the automatic driving vehicle 1A.

When the usage permitting confirmation result is received from the taxi allocation managing server 7, the automatic driving vehicle 1A determines that the second user authentication is succeeded, and permits taxi usage of the customer. When the usage non-permission result is received from the taxi allocation managing server 7, the automatic driving vehicle 1A determines that the second user authentication is not succeeded, and rejects the taxi usage of the customer.

As described above, in this second embodiment, in a case where the first user authentication is succeeded and the second user authentication is succeeded, it is controlled so as to permit the taxi usage of the customer. Namely, in a case where the first user authentication is succeeded, the taxi usage of the customer is not permitted immediately. In a case where the second user authentication is then succeeded, the taxi usage of the customer is permitted finally.

In this regard, in this second embodiment, the authentication processing for the caller according to the first embodiment does not exist, and only the user authentication is carried out.

[Example of Hardware Configuration of Automatic Driving Vehicle 1A as Example of Vehicle According to Second Embodiment]

Figure 10:
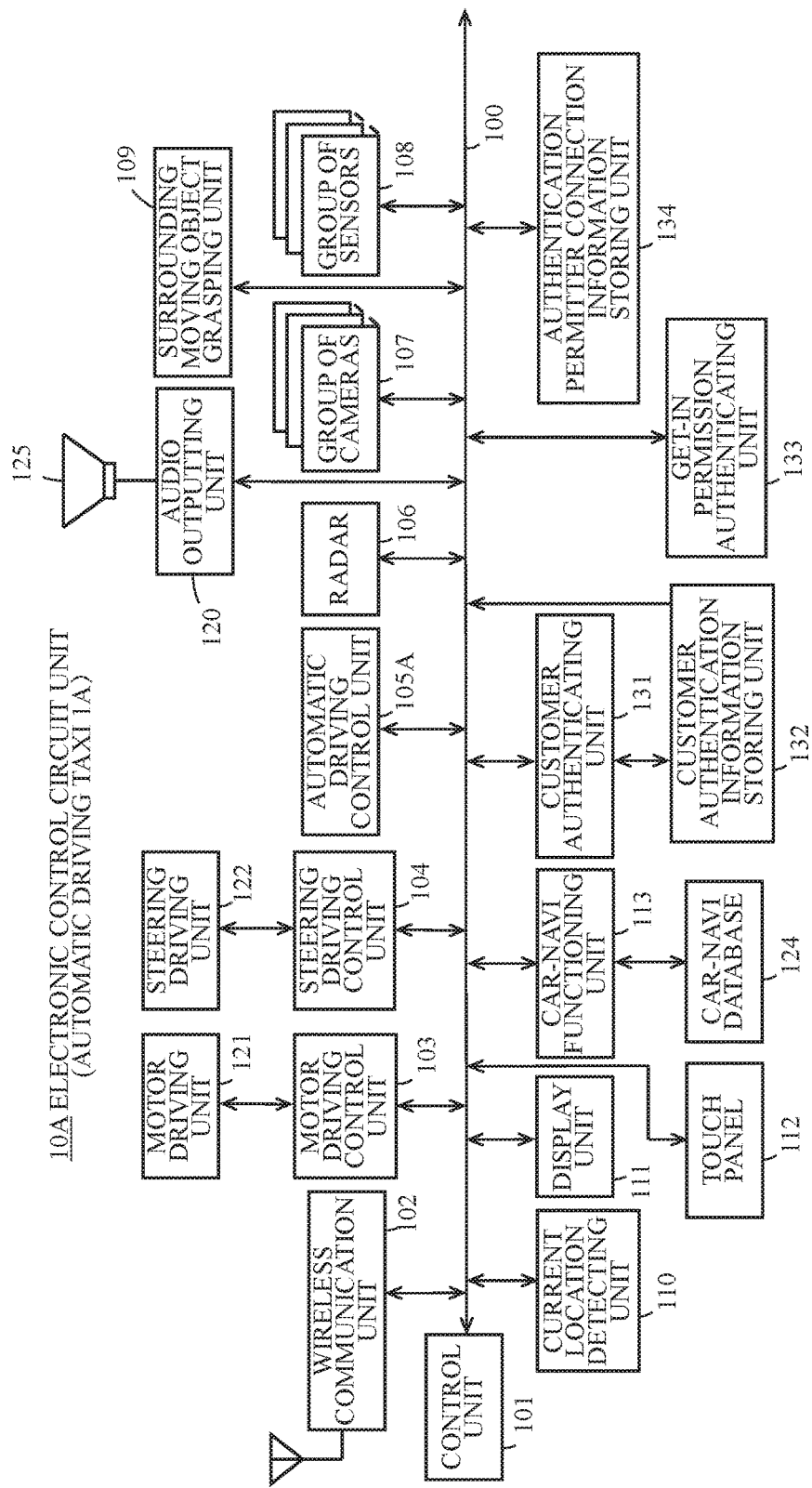
FIG. 10 is a block diagram showing an example of a hardware configuration of one example of the automatic driving vehicle, which is a vehicle according to the second embodiment of this invention.

FIG. 10 is a block diagram showing an example of a hardware configuration of an electronic control circuit unit 10A in an automatic driving vehicle (automatic driving taxi) 1A that is a vehicle according to the second embodiment of this invention. In FIG. 10, the same reference numerals are respectively assigned to the same components of the electronic control circuit unit 10 in the automatic driving vehicle 1 according to the first embodiment shown in FIG. 2, and their explanation is omitted.

As shown in FIG. 10, in the electronic control circuit unit 10A in the automatic driving vehicle 1A according to this embodiment, the user authenticating unit 114, the user authentication information storing unit 115, the caller authenticating unit 116, the caller authentication information storing unit 117, the user-and-caller permission authenticating unit 118, and the authentication permitter connection information storing unit 119 in the automatic driving vehicle 1 according to the first embodiment are not provided. Alternatively, a customer authenticating unit 131, a customer authentication information storing unit 132, a get-in permission authenticating unit 133, and an authentication permitter connection information storing unit 134 are provided therein.

Further, the automatic driving vehicle 1A according to this second embodiment does not have a manual driving mode. For this reason, a manual/automatic driving mode switching control unit 105 and a manual driving operation detecting unit 123 are not provided. Alternatively, the automatic driving control unit 105A that carries out the control processing for the automatic driving, which has been explained in the first embodiment, is provided. The others are configured in the similar to those in the automatic driving vehicle 1 according to the first embodiment.

Information for authentication of a user who carries out a calling request for a taxi, which is transmitted from a taxi allocation managing server 7 of a taxi company, (information for authentication of the first user authentication) is stored in the customer authentication information storing unit 132 as customer (or passenger) information for authentication. In this embodiment, a face image of the user who is a member to carry out the calling request for the taxi is transmitted to the automatic driving vehicle 1A from the taxi allocation managing server 7. Information of the face image is then stored in the customer authentication information storing unit 132.

The customer authenticating unit 131 carries out the first user authentication. Namely, in this embodiment, when the user gets into the automatic driving vehicle 1A, a face image of the user is photographed to obtain information for authentication of the user. The customer authenticating unit 131 then refers to the obtained face image and the face image as the information for authentication stored in the customer authentication information storing unit 132 so as to be compared with each other, and carries out the first user authentication by determining whether the face images coincide with each other or not.

The get-in permission authenticating unit 133 has a function to obtain second information for authentication from a customer, and a function to generate a communication channel with the authentication permitter (in this example, the taxi allocation managing server 7), transmit the information for authentication obtained from the customer to the authentication permitter through the generated communication channel, and obtain information on permission or not from the authentication permitter.

In this embodiment, the telephone number, the email address, or an URL (Uniform Resource Locator) for generating a communication channel with the taxi allocation managing server 7 is stored in the authentication permitter connection information storing unit 134 as the authentication permitter connection information.

The electronic control circuit unit 10A in the automatic driving vehicle 1A is configured as described above. However, the control unit 101 may realize, as software processing, the respective processing functions of the motor driving control unit 103, the steering driving control unit 104, the automatic driving control unit 105A, the surrounding moving object grasping unit 109, the current location detecting unit 110, the car-navi functioning unit 113, the audio outputting unit 120, the customer authenticating unit 131, and the get-in permission authenticating unit 133 of the blocks shown in FIG. 10.

[Example of Hardware Configuration of Taxi Allocation Managing Server 7]

Figure 11:
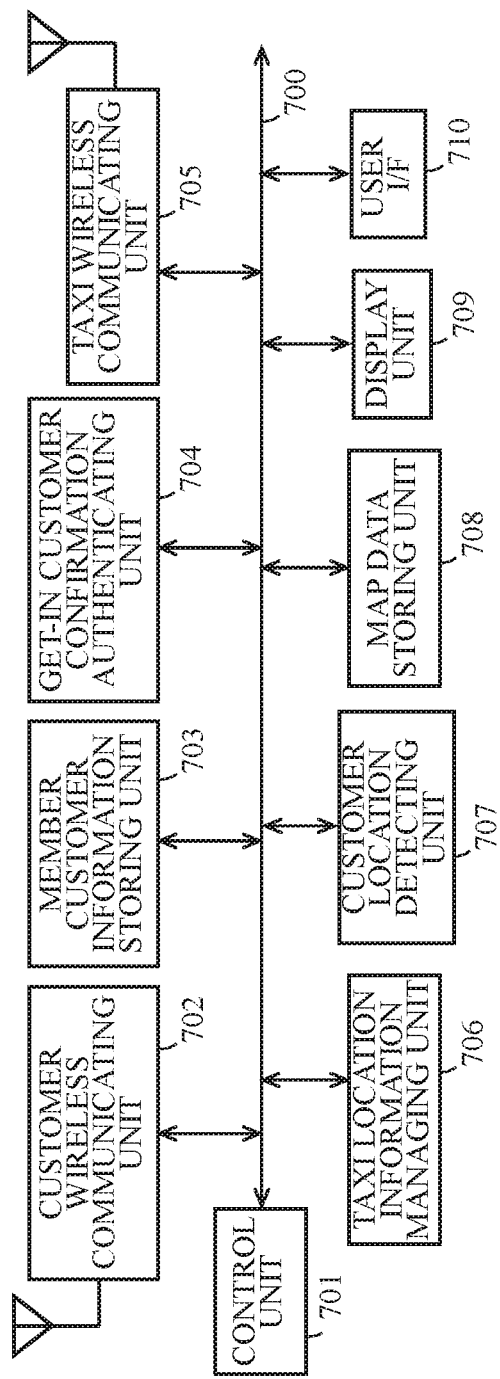
FIG. 11 is a block diagram showing an example of a hardware configuration of a taxi allocation managing server in the system illustrated in FIG. 9.

FIG. 11 is a block diagram showing an example of a hardware configuration of the taxi allocation managing server 7.

As shown in FIG. 11, the taxi allocation managing server 7 is configured so that a customer wireless communicating unit 702, a member customer information storing unit 703, a get-in customer confirmation authenticating unit 704, a taxi wireless communicating unit 705, a taxi location information managing unit 706, a customer location detecting unit 707, a map data storing unit 708, a display unit 709, and an operator user interface 710 are connected to a control unit 701 configured by a computer via a system bus 700.

The customer wireless communicating unit 702 is a wireless communicating unit dedicated to reception of a taxi calling request from a customer. In this embodiment, the customer wireless communicating unit 702 receives the taxi calling request of the customer, which is transmitted through a mobile phone network.

As described above, biological information such as a face image, a voice, a fingerprint, a vein, and an iris of the member, a name, an address, the date of birth, an ID, a password, a telephone number of the mobile phone terminal, an email address, credit card information, settlement information such as bank account information of a financial institution are stored in the member customer information storing unit 703.

When a taxi calling request is received from the mobile phone terminal of a customer of a member, the get-in customer confirmation authenticating unit 704 determines whether the customer is a customer member or not on the basis of the telephone number, the ID, and the password registered in the member customer information storing unit 703. In a case where it is determined that the customer is a customer member, the control it 701 carries out a process to receive the taxi calling request.

Further, the get-in customer confirmation authenticating unit 704 has a function to communicate information for authentication for the second user authentication to the mobile phone terminal of the customer member. In this case, in this embodiment, the get-in customer confirmation authenticating unit 704 arbitrarily selects one piece or plural pieces of information other than information used for the first user authentication (in this example, the face image information) of the registered information of the member from whom the taxi calling request is received, defines the selected information as information for authentication for the second user authentication, and communicates the information for authentication for the second user authentication to the mobile phone terminal of the customer member.

Moreover, when a request for confirmation authentication is transmitted from the automatic driving vehicle 1A together with information for authentication of the second user authentication, the get-in customer confirmation authenticating unit 704 determines whether permission authentication is succeeded or not on the basis of whether the transmitted information for authentication coincides with information for authentication defined when to carry out the taxi calling request or not. In a case where it is determined that the permission authentication is succeeded, the usage permitting confirmation result is returned to the automatic driving vehicle 1A. In a case where it is determined that the permission authentication is not succeeded, the usage non-permission result is returned to the automatic driving vehicle 1A.

The taxi wireless communicating unit 705 generates a communication channel each of the automatic driving vehicles 1A, each of which is the taxi, and exchanges various kinds of information.

The taxi location information managing unit 706 always monitors current location information, which is transmitted from the automatic driving vehicle 1A, and manages locations of the respective automatic driving vehicles 1A, each of which is a taxi. In this embodiment, the taxi location information managing unit 706 causes the display unit 709 to display a current location of the automatic driving vehicle 1A, which is the taxi, on a map displayed on the display screen of the display unit 709.

When the taxi calling request is received from the mobile phone terminal of the customer in the members, the customer location detecting unit 707 extracts current location information of the member customer contained in the taxi calling request, and detects a customer location. Then, the control unit 701 causes the display unit 709 to display the detected customer location on the display screen.

Map data are stored in the map data storing unit 708. The map data storing unit 708 causes the display unit 709 to display a map image by the map data on the display screen thereof.

The operator user interface 710 is an interface through which the operator carries out an input work via telephone communication with the customer member and the display screen of the display unit 709. The operator defines a taxi to be allocated on the basis of the customer location displayed on the map of the display screen and the taxi location, and instructs the automatic driving vehicle 1A thus defined to communicate the customer location and the information for authentication of the customer thereto. The control unit 701 communicates the customer location and the information for authentication of the customer with the automatic driving vehicle 1A through the taxi wireless communicating unit 705 in accordance with the instruction.

In this regard, in FIG. 11, the functions of the respective units including the get-in customer confirmation authenticating unit 704, the taxi location information managing unit 706, and the customer location detecting unit 707 may be configured as software processing in which the control unit 701 executes programs.

[Receiving Processing of Taxi Calling Request from Customer in Taxi Allocation Managing Server 7]

Figure 12:
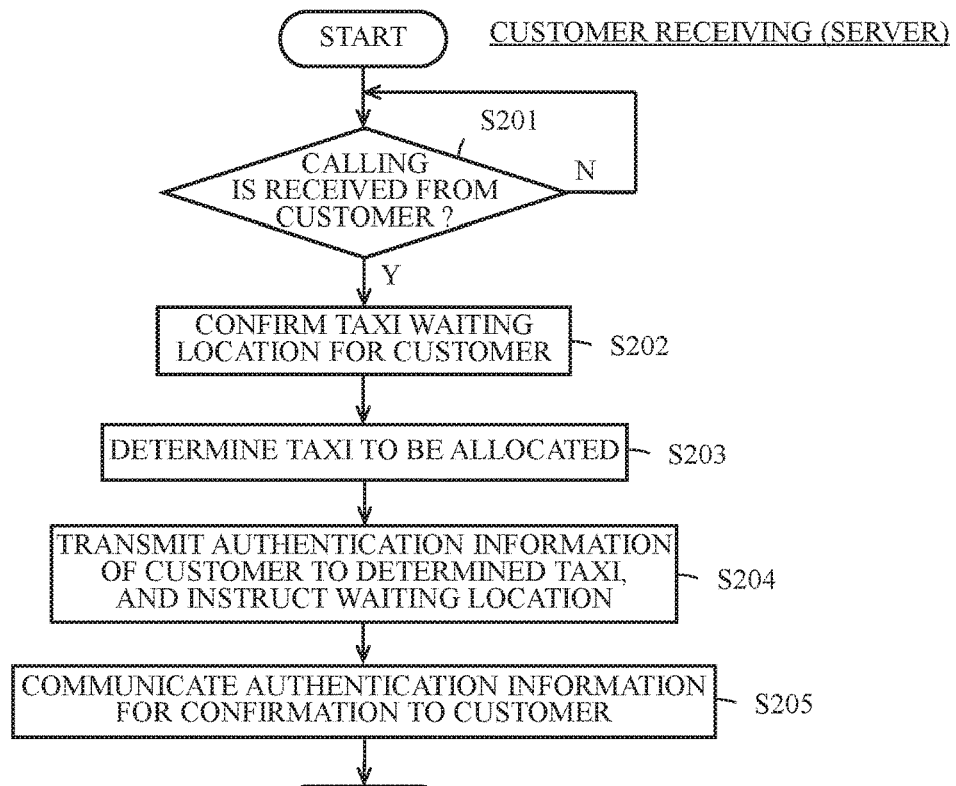
FIG. 12 is a view showing a flowchart for explaining an example of a receiving processing operation in the taxi allocation managing server illustrated in FIG. 11 when a taxi calling request is received from a customer.

FIG. 12 is a view showing a flowchart for explaining an example of a flow of receiving processing of a taxi calling request from a customer in the taxi allocation managing server 7. in this regard, processes of the respective steps in FIG. 12 will be described as a case where the control unit 701 carries out the functions of the respective units including the get-in customer confirmation authenticating unit 704, the taxi location information managing unit 706 and the customer location detecting unit 707, as software functioning means.

The control unit 701 of the taxi allocation managing server 7 determines whether a taxi calling request is received from any customer member or not (Step S201). In this case, in a case where the taxi calling request is received at Step S201 from the mobile phone terminal of the customer who is a member as described above, the control unit 701 determines whether it is a customer of a member or not by determining whether a telephone number, an ID, and a password contained in the taxi calling request coincide with a telephone number, an ID, and a password registered in the member customer information storing unit 703 or not. In a case where it is determined to be the customer member, the control unit 701 receives the taxi calling request.

In a case where it is determined at Step S201 that no taxi calling request is received from any customer member, the control unit 701 continues the process at Step S201.

In a case where it is determined at Step S201 that the taxi calling request is received from the customer member, the control unit 701 extracts location information contained in the taxi calling request, causes the display unit 709 to display a taxi waiting location of the customer on the display screen, and causes the operator to confirm it (Step S202).

Next, the control unit 701 receives, from the operator, instruction information for a taxi to be allocated, and determines the taxi to be allocated (Step S203). The control unit 701 transmits the information for authentication of the customer from whom the instruction information is received for the first user authentication (in this embodiment, information on the face image) to the automatic driving vehicle 1A, which is the determined taxi, transmits the location information on the waiting location of the customer, and instructs the waiting location (Step S204).

The control unit 701 then defines the information for authentication of the second user authentication, and communicates the information for authentication of the second user authentication thus defined to the mobile phone terminal of the customer who carried out the taxi calling request (Step S205). That is all, the receiving processing of the taxi calling request is completed.

[Customer Receiving Processing in Automatic Driving Vehicle 1A]

Figure 13:
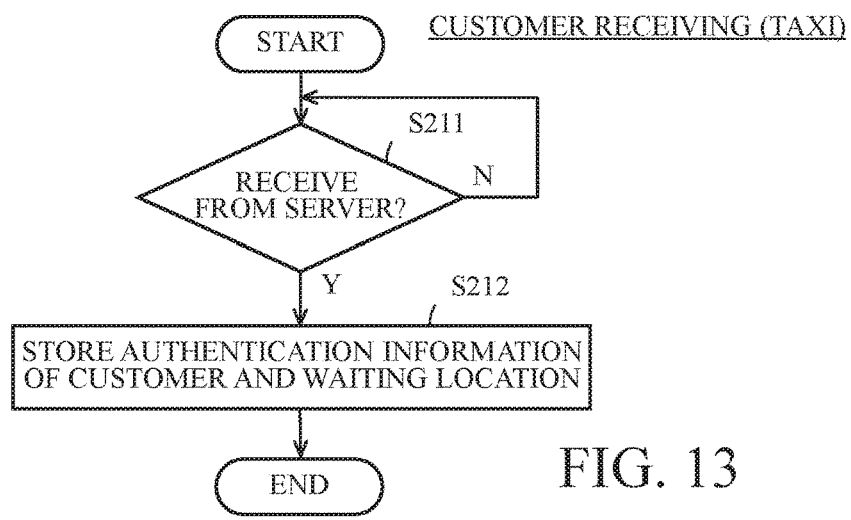
FIG. 13 is a view showing a flowchart for explaining an example of a receiving processing operation for information of the customer in the automatic driving vehicle constituting a taxi illustrated in FIG. 10.

FIG. 13 is a flowchart for explaining an example of a flow of customer receiving processing in the automatic driving vehicle 1A. Namely, the control unit 101 of the automatic driving vehicle 1A waits for reception of information from the taxi allocation managing server 7 (Step S211). In a case where it is determined that there is reception of information from the taxi allocation managing server 7, the control unit 101 stores the received information for authentication of the customer in the customer authentication information storing unit 132, and stores location information of a waiting location in a storing unit of a destination of the car-navi functioning unit 113 (Step S212). That is all, the customer receiving processing in the automatic driving vehicle 1A is terminated.

[Example of Customer Get-in Control Processing Operation in Automatic Driving Vehicle 1A]

Figure 14:
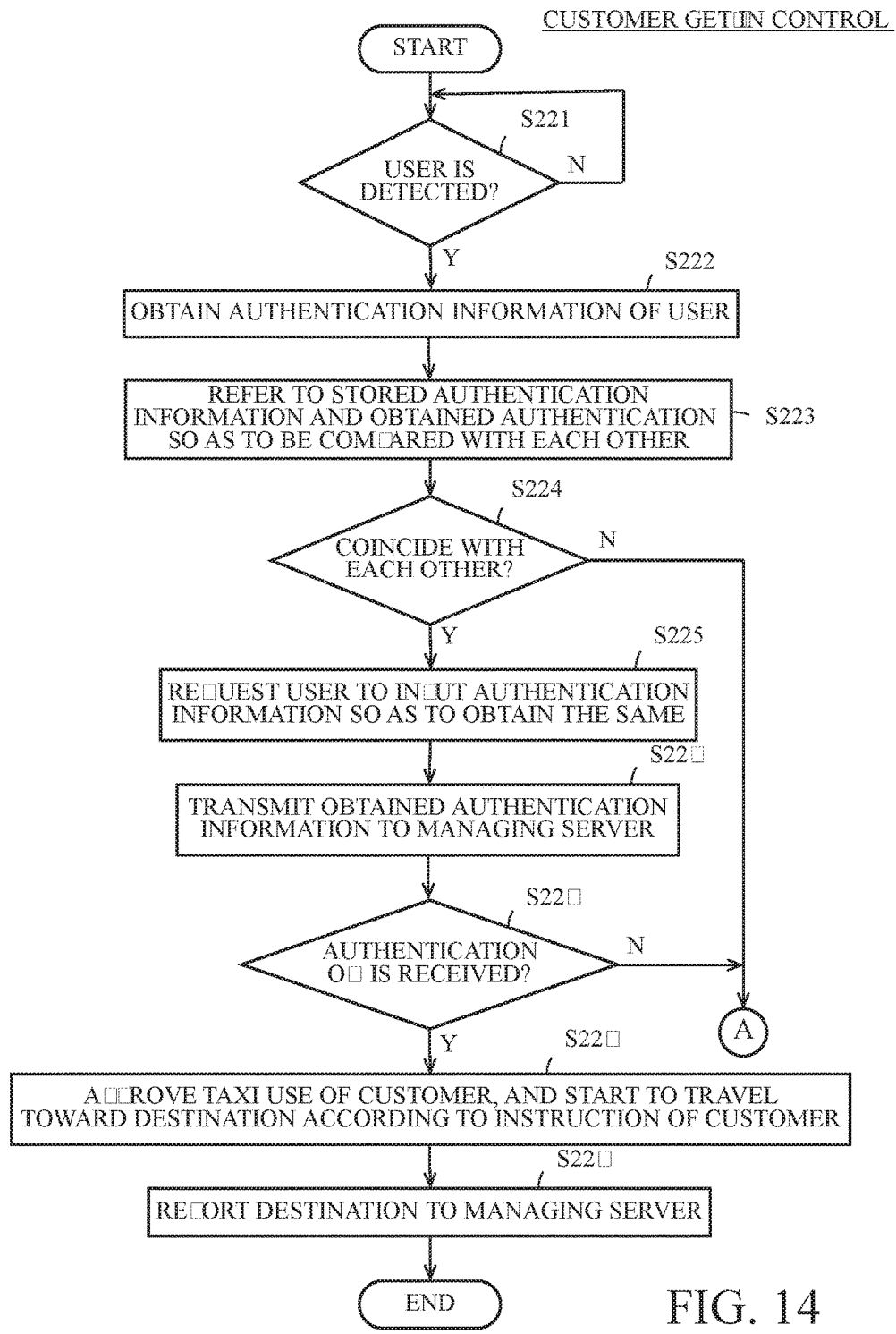
Figure 15:
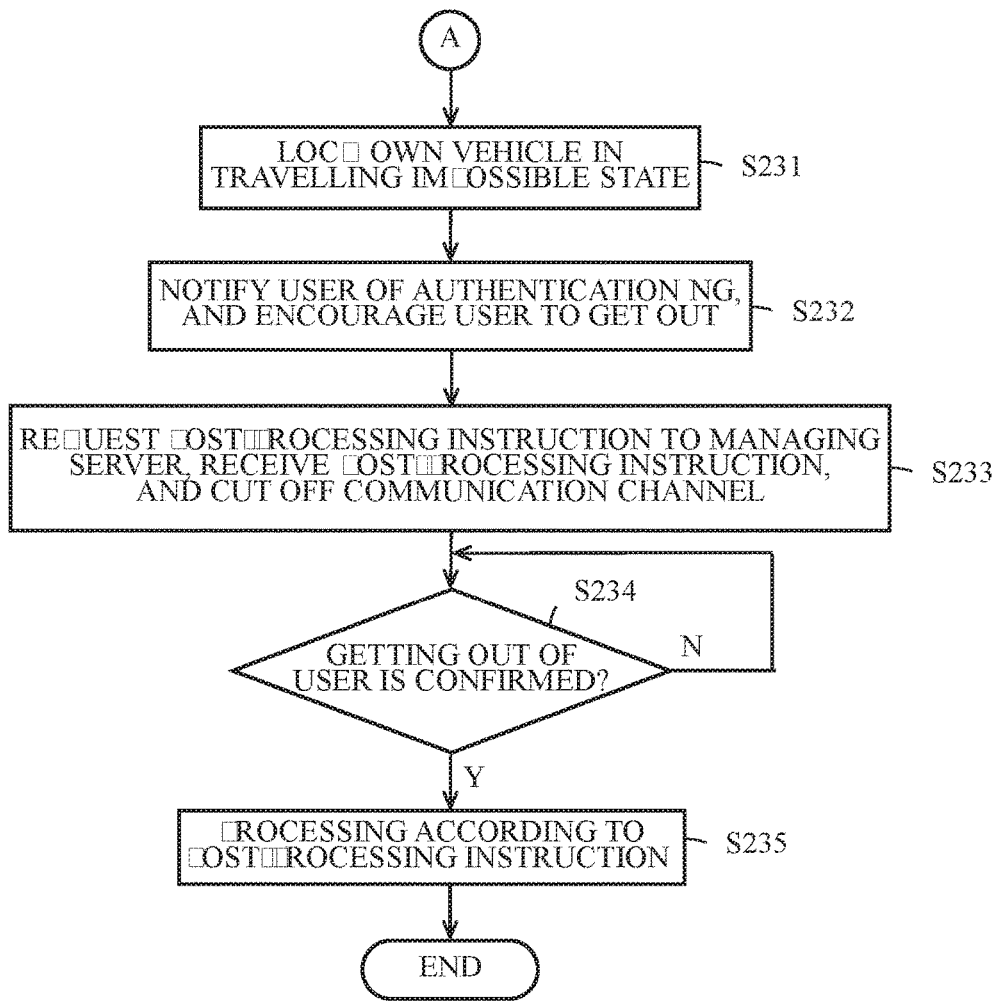

FIG. 14 and FIG. 15, which follows FIG. 14, is a flowchart for explaining an example of a flow of a customer get-in control processing operation in the automatic driving vehicle 1A.

The control unit 101 monitors whether user's getting in the automatic driving vehicle 1 is detected or not, and wait for detection of user's getting in the automatic driving vehicle 1 (Step S221). In a case where it is detected at Step S221 that the user gets in the automatic driving vehicle 1A, the control unit 101 photographs a face image of the user (or a driver) who gets in the automatic driving vehicle 1A by means of a camera configured to photograph a passenger of the front passenger seat or the rear passenger seat of the group of cameras 107 (Step S222).

Next, the control unit 101 carries out the first user authentication. Namely, in this example, the control unit 101 refers to the face image of the customer member who requested the taxi calling, stored in the customer authentication information storing unit 132, and the face image of the passenger so as to be compared with each other (Step S223), and determines whether both of the face images coincide with each other or not (Step S224).

In a case where it is determined at Step S224 that the face images coincide with each other and the first user authentication is succeeded, the control unit 101 carries out the second user authentication as follows. Namely, the control unit 101 requests the passenger to obtain information for authentication defined when the taxi calling request is received by means of a voice through the speaker 125 and by displaying a message on the display screen of the display unit 111, and obtains the information for authentication from the passenger who receives the request (Step S225). In this case, for example, in a case where the information for authentication contains a name, an ID and a password of the user, the user inputs the name, the ID and the password of the user in response to this request. Thus, the control unit 101 receives the input.

Next to Step S225, the control unit 101 generates a communication channel with the taxi allocation managing server 7, which is the authentication permitter, through the wireless communication unit 102 using the information for connection stored in the authentication permitter connection information storing unit 134. The control unit 101 then transmits the information for permission authentication of the user obtained at Step S225 to the taxi allocation managing server 7 through the generated communication channel, and requests the confirmation authentication by the taxi allocation managing server 7 (Step S226).

In response to the authentication request to the taxi allocation managing server 7 at Step S226, as described above, any one of the usage permitting confirmation result and the usage non-permission result is transmitted from the taxi allocation managing server 7. Accordingly, the control unit 101 determines whether the second user authentication is succeeded or not on the basis of whether the usage permitting confirmation result is received from the taxi allocation managing server 7 or not (Step S227). In a case where it is determined at Step S227 that the usage permitting confirmation result is received from the taxi allocation managing server 7 and the second user authentication is succeeded, the control unit 101 permits the taxi usage (get-in) of the get-in seat.

In a case where it is determined at Step S224 that the first user authentication is not succeeded, or in a case where it is determined at Step S227 that the usage permitting confirmation result is not received from the taxi allocation managing server 7 but the usage non-permission result is received and the second user authentication is not succeeded, the control unit 101 locks the own vehicle in the traveling impossible state, and sets to the non-permission state in which the passenger cannot use the taxi (Step S231 in FIG. 15).

The control unit 101 then generates a voice message indicating the authentication is not succeeded and a voice message to encourage the passenger to get out from the automatic driving vehicle 1A by means of voice synthesis, for example, and notifies the passenger of it by emitting sound through the speaker 125 (Step S232).

Next, the control unit 101 requests the post-processing instruction thereafter to the taxi allocation managing server 7. When the post-processing instruction is received, the control unit 101 cuts off the communication channel with the taxi allocation managing server 7 (Step S233). As the post-processing instruction, there is an indication "return to parking" or "reception of another taxi user", for example.

Next, the control unit 101 determines whether getting out from the automatic driving vehicle 1A of the passenger is confirmed or not (Step S234). In a case where it is determined that the getting out from the automatic driving vehicle 1A of the user can be confirmed, the control unit 101 carries out processing such as a movement control according to the post-processing instruction received at Step S233 (Step S235). That is all, the control unit 101 terminates this calling handling processing routine.

[Effects of Second Embodiment]

According to the second embodiment described above, it is possible to realize a taxi service of the automatic driving vehicle by means of an unmanned operation. In the second embodiment described above, authentication for the customer is carried out on the basis of the first user authentication by the information for authentication registered for the customer and the second user authentication by the information for authentication defined in advance with the customer in the taxi allocation managing server 7. Therefore, there are effects that the authentication itself becomes strict, the authentication for the customer can be carried out certainly, and it is possible to prevent unauthorized use strictly.

[Variant of Second Embodiment]

In the explanation for the second embodiment described above, the face image of the user is used as information for user authentication for the first user authentication (customer authentication), and the name, the ID and the password of the user are used as the second user authentication for confirmation of the user. However, on the contrary, the name, the ID and the password of the user may be used as the information for user authentication for the first user authentication (customer authentication), and the face image of the user may be used as the second user authentication. In short, in this second embodiment, part of information in the information registered as the member may be communicated to the automatic driving vehicle 1A, which is a taxi, as the information for the first user authentication, and the other in the information registered as the member may be used as the information for the second user authentication.

Further, in the second embodiment described above, the information for the first user authentication and the information for the second user authentication is the information registered by the taxi user 2C who became a member for a taxi calling service of the taxi company in advance. However, they are not limited to the information thus registered. For example, when the taxi user makes a phone call to the taxi allocation managing server 7 to request calling of a taxi, information for the first user authentication and information for the second user authentication may be defined in communication with the taxi allocation managing server 7, and they may be transmitted from the mobile phone terminal of the taxi user to the taxi allocation managing server 7. In this case, the taxi user is not required to become a member for the taxi calling service of the taxi company. In this regard, a settlement method has no direct relationship to the user authentication according to this invention in which the user gets in a taxi. Therefore, in this embodiment, its explanation is omitted.

Further, in the explanation mentioned above, an unmanned operation taxi has been assumed. However, in a case of the automatic driving vehicle that a taxi driver operates, this invention can also be applied. In such a case, the operator of the taxi allocation managing server 7 can notify the taxi driver of the usage permitting confirmation result by the taxi allocation managing server 7. In this regard, in this case, the taxi driver can settle for it, and cash settlement is also possible.

In this regard, the usage permission confirmation by the taxi allocation managing server 7 may be carried out by the operator of the taxi allocation managing server 7. In such a case, in a case where the information for authentication for the usage permission confirmation is the face image of the user, for example, and the registered face image is only a face image from the front but the face image transmitted from the automatic driving vehicle 1A is a face image photographed from an oblique side, comparison authentication by visual recognition of the operator can be carried out. Thus, it is possible to carry out the user confirmation well. For this reason, as the face image registered in the taxi allocation managing server 7, only a face image from one direction such as the front becomes sufficient. Further, on the contrary, face images from a plurality of angles may be registered, whereby authentication accuracy can be enhanced, and the user confirmation can be carried out strictly.

As the information for authentication of the first user authentication, the biological information such as the face image, the voice, the fingerprint, the vein, and the iris of the user are used. However, it is not limited to this. The information for authentication of the first user authentication may be the similar information to the information for authentication of the second user authentication such as a name, an address, the date of birth, an ID, a password, a telephone number and an email address of the mobile phone terminal, for example.

[Other Embodiment or Variant]

In this regard, in the first and second embodiments, the first user authentication is carried out after the user get into the automatic driving vehicle. However, before the user gets into the automatic driving vehicle, the vehicle according to this invention photographs a face image of a user, collects a voice of the user, and carries out acquisition of a fingerprint, whereby the first user authentication can also be carried out. In such a case, the vehicle according to this invention may control so as to: carry out the first user authentication; open the door that is locked; and permit the user to get into the automatic driving vehicle (this is also a kind of permission of usage). Namely, the vehicle according to this invention may be configured so as to carry out the open/close control of the door in accordance with a user authentication result.

In the case of the second embodiment, getting in of the user may be permitted in accordance with authentication results of the first user authentication and the second user authentication. Alternatively, getting in of the user is permitted by only the first user authentication, and the second user authentication is carried out for the user who is permitted to get in the automatic driving vehicle 1A then gets in the automatic driving vehicle 1A. Thus, it is possible to control so that usage of the automatic driving vehicle 1A as a taxi is permitted in a case where the second user authentication is succeeded.

Further, a case where the vehicle according to the embodiments described above is an electric vehicle has been explained, but the vehicle may be a gasoline-powered vehicle, a hybrid vehicle, a fuel-cell vehicle, or other drive system vehicle.

It should be noted that in the above embodiments the vehicle provided with four wheels has been explained, but the vehicle according to this invention includes a motorcycle, a motor tricycle and the like.

EXPLANATION OF SYMBOLS 1, 1A . . . automatic driving vehicle
10, 10A . . . electronic control circuit unit
101 . . . control unit
102 . . . wireless communication unit
114 . . . user authenticating unit
115 . . . user authentication information storing unit
116 . . . caller authenticating unit
117 . . . caller authentication information storing unit
118 . . . user/caller (user-and-caller) permission authenticating unit
119 . . . authentication permitter connection information storing unit
131 . . . customer authenticating unit
132 . . . customer authentication information storing unit
133 . . . get-in permission authenticating unit
134 . . . authentication permitter connection information storing unit

The invention claimed is:

1. A vehicle comprising:
   a network interface configured to carry out communication with a terminal device;
   a control circuit;
   at least one biological information reader;
   a memory including a set of executable instructions that, when executed by the control circuit, causes the control circuit to perform operations including:
   storing, by the memory, communication information of an authentication permitter;
   reading, by the at least one biological information reader, biological information of a last person to exit the vehicle, the reading of the biological information of the last person to exit the vehicle performed at a time the last person to exit the vehicle exits the vehicle;
   storing, by the memory, the biological information of the last person to exit the vehicle;
   receiving a calling request from the terminal device by means of the network interface, the calling request being from a user of the terminal device, the user trying to use the vehicle;
   reading, by the biological information reader, the biological information of the user, wherein biological information is at least one of face image recognition, voice recognition, fingerprint authentication, vein authentication, and iris authentication;
   storing, by the memory, the biological information of the user;
   carrying out a first authentication by comparing the biological information of the user and the biological information of the last person to exit the vehicle, the first authentication being successful when the biological information of the user and the biological information of the last person to exit the vehicle match;
   when the first authentication is not successful, carrying out a second authentication for the user, the second authentication including connecting with the authentication permitter by means of the network interface using the communication information of the authentication permitter, transmitting to the authentication permitter a request for a confirmation of the user, the second authentication being successful when receiving the confirmation from the authentication permitter;
   determining that the user is allowed to use the vehicle when the first authentication or the second authentication is successful;
   controlling the vehicle to avow the user to use the vehicle when the first authentication or the second authentication is successful;
   and locking the vehicle in a traveling impossible state when the first authentication and the second authentication are not successful.

2. The vehicle according to claim 1, wherein the user is a person other than an owner of the vehicle.

3. The vehicle according to claim 1, wherein the authentication permitter is one of an owner, a driver, and a passenger of the vehicle.

4. The vehicle according to claim 1, further comprising:
   setting the first authentication, the second authentication, or both of the first and second authentication to an ON or OFF state.

5. The vehicle according to claim 1, wherein the biological information of the user is transmitted from an administrator who manages the vehicle.

6. The vehicle according to claim 1, wherein the authentication permitter is an administrator who manages the vehicle.

7. The vehicle according to claim 1, wherein the vehicle carries out automatic driving by autonomous traveling.

8. The vehicle according to claim 7, further comprising:
   receiving instruction information from the terminal device through the network interface, and detecting a meeting location specified by the instruction information;
   detecting a current location of the vehicle;
   obtaining map information and navigation information;
   moving the vehicle by autonomous traveling to the meeting location using the obtained map information, the obtained navigation information, and the detected current location of the vehicle; and
   waiting at the detected meeting location by using the obtained map information, the obtained navigation information, and the detected current location information.

9. The vehicle according to claim 8, wherein the vehicle moves to the detected meeting location autonomously by using the obtained map information, the obtained navigation information, and the detected current location information.

10. The vehicle according to claim 8, wherein the user of the terminal device is the authentication permitter.

11. A vehicle comprising:
    a network interface configured to carry out communication with a terminal device;
    a control circuit;
    at least one communication information reader;
    a memory including a set of executable instructions that, when executed by the control circuit causes the control circuit to perform operations including:
    storing, by the memory, communication information of an authentication permitter;
    reading, by the at least one communication information reader, communication information of a last person to exit the vehicle, wherein communication information is at least one of face image recognition, voice recognition, fingerprint authentication, vein authentication, and iris authentication, the reading of the communication information of the last person to exit the vehicle performed at a time the last person to exit the vehicle exits the vehicle;
    storing, by the memory, the communication information of the last person to exit the vehicle;
    receiving a calling request from the terminal device by means of the network interface, the calling request being from a user of the terminal device, the user trying to use the vehicle, the calling request including communication information of the user;
    storing, by the memory, the communication information of the user;
    carrying out a first authentication for the user by comparing the communication information of the user and the communication information of the last person to exit the vehicle, the first authentication being successful when the communication information of the user and the communication information of the last person to exit the vehicle match;
    when the first authentication is not successful, carrying out a second authentication for the user, the second authentication including connecting with the authentication permitter by means of the network interface using the communication information of the authentication permitter, transmitting to the authentication permitter a request for a confirmation of the user, the second authentication being successful when receiving the confirmation from the authentication permitter;

determining to move the vehicle by autonomous traveling when the first authentication or the second authentication is successful;

and moving the vehicle by autonomous traveling when the first authentication or the second authentication is successful.

12. The vehicle according to claim 11, wherein the operations further include:

detecting a current location of the vehicle;

obtaining map information and navigation information; and moving the vehicle by autonomous traveling to a meeting location using the obtained map information, the obtained navigation information, and the detected current location information;

wherein information on the meeting location is contained in information received in the calling request from the terminal device.

13. The vehicle according to claim 12, wherein the operations further include:

calculating a predictive time required to move from the current location to the meeting location, wherein, when responding to the user, the vehicle is moved to the meeting location and notifies the terminal device of the predictive time.

14. The vehicle according to claim 12, wherein the last person to exit the vehicle is a passenger of the vehicle.

15. The vehicle according to claim 12, wherein the authentication permitter is an owner or a passenger of the vehicle.

16. The vehicle according to claim 12, further comprising:

storing, by the memory, communication information of at least one person authorized to use the vehicle; and comparing, in the first authentication, the communication information of the user and the communication information of the at least one person authorized to use the vehicle, the first authentication being successful when the communication information of the user and the communication information of the at least one person authorized to use the vehicle match.

17. A non-transitory computer-readable recording medium storing a program for a vehicle, the vehicle comprising a network interface, a memory, at least one biological information reader, and a computer, the network interface configured to carry out communication with a terminal device, the program causing the computer to perform operations comprising:

storing, by the memory, communication information of an authentication permitter;

reading, by the at least one biological information reader, biological information of a last person to exit the vehicle, wherein biological information is at least one of face image recognition, voice recognition, fingerprint authentication, vein authentication, and iris authentication, the reading of the biological information of the last person to exit the vehicle performed at a time the last person to exit the vehicle exits the vehicle;

storing, by the memory, the biological information of the last person to exit the vehicle;

receiving a calling request from the terminal device by means of the network interface, the calling request being from a user of the terminal device, the user trying to use the vehicle;

reading, by the at least one biological information reader, biological information of the user;

storing, by the memory, the biological information of the user;

carrying out a first authentication by comparing the biological information of the user and the biological information of the last person to exit the vehicle, the first authentication being successful when the biological information of the user and the biological information of the last person to exit the vehicle match;

when the first authentication is not successful, carrying out a second authentication for the user, the second authentication including connecting with the authentication permitter by means of the network interface using the communication information of the authentication permitter, transmitting to the authentication permitter a request for a confirmation of the user, the second authentication being successful when receiving the confirmation from the authentication permitter;

determining that the user is avowed to use the vehicle when the first authentication or the second authentication is successful;

controlling the vehicle to allow the user to use the vehicle when the first authentication or the second authentication is successful;

and locking the vehicle in a traveling impossible state when the first authentication and the second authentication are not successful.

18. A non-transitory computer-readable recording medium storing a program for a vehicle, the vehicle comprising a network interface, a memory, at least one biological information reader, and a computer, the network interface configured to carry out communication with a terminal device, the program causing the computer to perform operations comprising:

storing, by the memory, communication information of an authentication permitter;

reading, by the at least one biological information reader, biological information of a last person to exit the vehicle, wherein biological information is at least one of face image recognition, voice recognition, fingerprint authentication, vein authentication, and iris authentication, the reading of the biological information of the last person to exit the vehicle performed at a time the last person to exit the vehicle exits the vehicle;

storing, by the memory, the biological information of the last person to exit the vehicle;

receiving a calling request from the terminal device by means of the network interface, the calling request being from a user of the terminal device, the user trying to use the vehicle, the calling request including biological information of the user;

storing, by the memory, the biological information of the user;

carrying out a first authentication for the user by comparing the biological information of the user and the biological information of the last person to exit the vehicle, the first authentication being successful when the biological information of the user and the biological information of the last person to exit the vehicle match;

when the first authentication is not successful, carrying out a second authentication for the user, the second authentication including connecting with the authentication permitter by means of the network interface using the communication information of the authentication permitter, transmitting to the authentication permitter a request for a confirmation of the user, the second authentication being successful when the confirmation is received from the authentication permitter;

determining to move the vehicle by autonomous traveling when the first authentication or the second authentication is successful; and moving the vehicle by autonomous traveling when the first authentication or the second authentication is successful.

* * * * *

UNITED STATES PATENT AND TRADEMARK OFFICE
CERTIFICATE OF CORRECTION

PATENT NO. : 10,369,967 B2
APPLICATION NO. : 15/120584
DATED : August 6, 2019
INVENTOR(S) : Sako et al.

Page 1 of 1

It is certified that error appears in the above-identified patent and that said Letters Patent is hereby corrected as shown below:

In the Claims

At Column 31, Line 48, please change "avow" to --allow--.

Signed and Sealed this
Third Day of March, 2020

Andrei Iancu
*Director of the United States Patent and Trademark Office*